US011292912B2

(12) United States Patent
Mouazen

(10) Patent No.: US 11,292,912 B2
(45) Date of Patent: Apr. 5, 2022

(54) BITUMEN SOLID AT AMBIENT TEMPERATURE

(71) Applicant: TOTAL MARKETING SERVICES, Puteaux (FR)

(72) Inventor: Mouhamad Mouazen, Nanterre (FR)

(73) Assignee: TOTAL MARKETING SERVICES, Puteaux (FR)

( * ) Notice: Subject to any disclaimer, the term of this patent is extended or adjusted under 35 U.S.C. 154(b) by 170 days.

(21) Appl. No.: 16/465,170

(22) PCT Filed: Dec. 6, 2017

(86) PCT No.: PCT/FR2017/053413
§ 371 (c)(1),
(2) Date: May 30, 2019

(87) PCT Pub. No.: WO2018/104660
PCT Pub. Date: Jun. 14, 2018

(65) Prior Publication Data
US 2019/0330472 A1  Oct. 31, 2019

(30) Foreign Application Priority Data
Dec. 7, 2016  (FR) ...................................... 1662031

(51) Int. Cl.
*C08L 95/00* (2006.01)

(52) U.S. Cl.
CPC ........... *C08L 95/00* (2013.01); *C08L 2555/24* (2013.01); *C08L 2555/26* (2013.01); *C08L 2555/74* (2013.01)

(58) Field of Classification Search
CPC .. C08L 95/00; C08L 2555/24; C08L 2555/26; C08L 2555/74
See application file for complete search history.

(56) References Cited

U.S. PATENT DOCUMENTS

| 3,026,568 | A |   | 3/1962  | Moar |
| 4,279,579 | A |   | 7/1981  | Froeschke |
| 4,305,812 | A |   | 12/1981 | Shih et al. |
| 4,455,216 | A |   | 6/1984  | Angevine et al. |
| 7,918,930 | B2 | * | 4/2011 | Lapalu .................... C10C 3/026 106/273.1 |
| 9,238,752 | B2 | * | 1/2016 | Lapalu ................. C08K 5/0008 |
| 2004/0069685 | A1 |   | 4/2004 | Inomata et al. |
| 2010/0056669 | A1 | * | 3/2010 | Bailey ...................... B29B 9/16 523/201 |
| 2011/0233105 | A1 |   | 9/2011  | Bailey |
| 2012/0123028 | A1 |   | 5/2012  | Dreesen et al. |
| 2015/0152265 | A1 |   | 6/2015  | Basset et al. |
| 2016/0304793 | A1 |   | 10/2016 | Merdrignac et al. |
| 2017/0226320 | A1 |   | 8/2017  | Mariotti et al. |

FOREIGN PATENT DOCUMENTS

| WO | 2004/020532 A1 | 3/2004 |
| WO | 2007/058994 A2 | 5/2007 |
| WO | 2007/128636 A2 | 11/2007 |
| WO | 2008/022836 A1 | 2/2008 |
| WO | 2008/043635 A1 | 4/2008 |
| WO | 2008/137394 A1 | 11/2008 |
| WO | 2008/141930 A1 | 11/2008 |
| WO | 2008/141932 A1 | 11/2008 |
| WO | 2009/015969 A1 | 2/2009 |
| WO | 2009/071467 A1 | 6/2009 |
| WO | 2009/153324 A1 | 12/2009 |
| WO | 2010/028261 A2 | 3/2010 |
| WO | 2011/000133 A1 | 1/2011 |
| WO | 2012/168380 A1 | 12/2012 |

OTHER PUBLICATIONS

Feb. 14, 2018 International Search Report issued in International Patent Application No. PCT/FR2017/053413.
Feb. 14, 2018 Written Opinion of The International Searching Authority issued in International Patent Application No. PCT/FR2017/053413.
Brunauer, Stephen et al. "Adsorption of Gases in Multimolecular Layers". Journal of the American Chemical Society, vol. 60, pp. 309-319, 1938.
Lee, Jung M. et al, "Separation of Solvent and Deasphalted Oil for Solvent Deasphalting Process". Fuel Processing Technology, vol. 119, pp. 204-210, 2014.

* cited by examiner

*Primary Examiner* — Yong L Chu
(74) *Attorney, Agent, or Firm* — Oliff PLC

(57) ABSTRACT

A bitumen granules including a core and a coating layer, in which the core includes at least one bitumen base, and the coating layer includes at least: one oil selected from a hydrocarbon oil of petroleum or synthetic origin; and at least one organogelator compound selected from among compounds of general formula (I), (II) or (V). The invention also relates to a method for producing bitumen granules, as well as to the use thereof as an asphalt binder, in particular for producing mixes. The invention further relates to a method for producing mixes from bitumen granules and also to a method for transporting and/or storing and/or handling bitumen granules.

19 Claims, No Drawings

BITUMEN SOLID AT AMBIENT TEMPERATURE

TECHNICAL FIELD

A subject matter of the present invention is a composition of bitumen in the divided form, which is solid at ambient temperature. The present invention also relates to a process for the preparation of a composition of bitumen which is solid at ambient temperature and also to its use as road binder, in particular for the manufacture of bituminous mixes.

The present invention also relates to a process for the manufacture of bituminous mixes from solid bitumen according to the invention and also to a process for the transportation and/or storage and/or handling of a composition of bitumen which is solid at ambient temperature according to the invention.

STATE OF THE PRIOR ART

The great majority of bitumen is used in construction, mainly in the manufacture of road carriageways, or in industry, for example for roofing applications. It is generally provided in the form of a black material which is highly viscous, indeed even solid, at ambient temperature and which fluidifies on heating.

Generally, bitumen is stored and transported under hot conditions, in bulk, in tank trucks or by boats at elevated temperatures of the order of 120° C. to 160° C. In point of fact, the storage and the transportation of bitumen under hot conditions exhibit certain disadvantages. Firstly, the transportation of bitumen under hot conditions in the liquid form is considered to be dangerous and it is highly restricted from a regulatory viewpoint. This mode of transportation does not present particular difficulties when the transportation equipment and infrastructures are in good condition. If this is not the case, it can become problematic: if the tank truck is not sufficiently lagged, the viscosity of the bitumen can increase during an excessively long trip. Bitumen delivery distances are therefore limited. Secondly, keeping bitumen at elevated temperatures in vessels or in tank trucks consumes energy. In addition, keeping bitumen at elevated temperatures for a lengthy period can affect the properties of the bitumen and thus change the final performance qualities of the bituminous mix.

In order to overcome the problems of the transportation and the storage of bitumen under hot conditions, packagings which make possible the transportation and the storage of bitumens at ambient temperature have been developed. This mode of transportation of bitumen in packaging at ambient temperature represents only a minimal fraction of the amounts transported worldwide but it corresponds to very real needs for geographic regions which are difficult and expensive to access by conventional transportation means.

Mention may be made, by way of example of packaging which makes possible transportation under cold conditions currently used, of packaging bitumen at ambient temperature in metal drums. This means is increasingly questionable from an environmental viewpoint because the bitumen stored in the drums must be reheated before it is used as road binder. In point of fact, this operation is difficult to carry out for this type of packaging and the drums constitute a waste after use. Furthermore, the storage of bitumen at ambient temperature in drums results in losses because the bitumen is very viscous and a part of the product remains on the walls of the drum when the bitumen is transferred into the vessels of the units for the production of bituminous mixes. With regard to the handling and the transportation of bituminous products in these drums, they can prove to be difficult and dangerous if specialized equipment for handling the drums is not available to the haulage contractors or at the site where the bitumen is used.

Mention may be made, as other examples of packaging, of bitumens in the form of pellets transported and/or stored in bags, often used in places where the ambient temperature is high. These pellets exhibit the advantage of being easily able to be handled. U.S. Pat. No. 3,026,568 describes bitumen pellets covered with a dusty material, such as limestone powder. Nevertheless, this type of bitumen as pellets does not prevent the bitumen from creeping, in particular at elevated ambient temperature.

The application WO2009/153324 describes bitumen pellets coated with a polymeric antiagglomerating compound, in particular polyethylene. The disadvantage of this coating is that it modifies the properties of the bitumen during its road application.

The application WO 2016/016318 describes bitumen pellets comprising a chemical additive which can be a mono- or polyacid, a hydrazide or a diamide. These bitumen pellets make possible the transportation and/or the storage and/or the handling of the bitumen at ambient temperature without the bitumen creeping, and also the reduction in their adhesion and agglomeration together.

The application US 2011/0233105 describes asphalt which is solid at ambient temperature in the form of pellets comprising a core and a coating layer. The core consists of recycled materials and of asphalt-based binder. The coating layer can include one or more water-resistant polymers, a wax or fines. The aim of this coating layer is to prevent the adhesion of the particles together but also to the adjacent surfaces during storage. This document does not disclose the content of viscosifying compound with respect to the total weight of the coating layer. Neither does it disclose the viscosity of the compounds participating in the composition of the coating layer FR 2 992 654 discloses bituminous compositions comprising a bitumen, a first additive comprising at least one fatty acid ester functional group and a second additive comprising at least one organogelator compound. These compositions exhibit an improved thermal susceptibility and can be used for road and industrial applications.

The applicant company has thus sought to develop bitumens capable of being subjected to elevated ambient temperatures without creeping, in particular bitumens in the form of pellets, the adhesion and the agglomeration of which during their transportation and/or storage and/or handling at elevated ambient temperature is reduced in comparison with the pellets of the prior art.

There thus exists a need to provide a bitumen composition which can be transported and/or stored and/or handled at ambient temperature and which makes it possible to overcome the disadvantages of the prior art.

An objective of the present invention is to provide a bitumen composition which can be transported and/or stored and/or handled at elevated ambient temperature, the properties of which are preserved over time.

In particular, the aim of the present invention is to provide a bitumen composition which can be transported and/or stored for a period of time of greater than 2 months, preferably than 3 months, and at elevated ambient temperature, in particular at a temperature of less than 100° C., preferably from 20° C. to 80° C.

Another objective of the invention is to provide a bitumen composition which can be easily handled, in particular at elevated ambient temperature, especially at a temperature ranging up to 100° C., preferably from 20° C. to 80° C.

In particular, the aim of the present invention is to provide a bitumen composition which can be easily handled after a prolonged duration of transportation and/or of storage at elevated ambient temperature, in particular for a duration of transportation and/or of storage of greater than 2 months, preferably of greater than 3 months, and at a temperature ranging up to 100° C., preferably between 20° C. and 80° C.

An objective of the present invention is to provide a bitumen composition in a form which allows it to flow in the solid form at ambient temperature, so as to be able to handle it without loss of material. The target has been to provide a bitumen composition which is in a form which makes it possible to package it in a container, to remove it from the container and to transfer it into an item of equipment, even at an elevated ambient temperature, without having to heat it and without loss of material. The bitumen provided is in a form which is divided and solid at ambient temperature, so that it makes it possible to satisfactorily solve the above-mentioned problems.

Another objective is to provide an industrial and economic process for manufacturing a bitumen composition which can be transported and/or stored and/or handled at ambient temperature.

Another objective of the invention is to provide an industrial and economic process for manufacturing bituminous mixes from a bitumen composition which can be transported and/or stored and/or handled at ambient temperature.

Another objective of the invention is to provide an ecological and economic process for transporting and/or storing and/or handling a bitumen composition at ambient temperature which makes it possible to avoid the use of additional means for maintaining said bitumen at temperature during the transportation and/or storage and/or handling and which makes it possible to minimize the presence of wastes and/or residues.

SUMMARY OF THE INVENTION

The invention relates to a bitumen which is solid at ambient temperature in the form of pellets comprising a core and a coating layer, in which:
the core comprises at least one bitumen base,
and
the coating layer comprises at least:
one oil chosen from a hydrocarbon oil of petroleum or synthetic origin,
one organogelator compound chosen from the compounds of general formula (I), (II) or (V):

$$Ar1\text{-}R_1\text{---}Ar2 \tag{I}$$

in which:
Ar1 and Ar2 represent, independently of one another, a benzene nucleus or a system of condensed aromatic nuclei of from 6 to 20 carbon atoms which are substituted by at least one hydroxyl group and optionally substituted by one or more $C_1$-$C_{20}$ alkyl groups, and
$R_1$ represents an optionally substituted divalent radical, the main chain of which comprises from 6 to 20 carbon atoms and at least one group chosen from the amide, ester, hydrazide, urea, carbamate and anhydride functional groups;

$$R_2\text{---}(NH)_n CONH\text{---}(X)_m\text{---}(NHCO)_p(NH)_n\text{---}R_2' \tag{II}$$

in which:
the $R_2$ and $R_2'$ groups, which are identical or different, represent a saturated or unsaturated and linear, branched or cyclic hydrocarbon chain comprising from 1 to 22 carbon atoms which is optionally substituted and which optionally comprises one or more heteroatoms, such as N, O or S, $C_5$-$C_{24}$ hydrocarbon rings and/or $C_4$-$C_{24}$ hydrocarbon heterocycles comprising one or more heteroatoms, such as N, O or S, and $R_2'$ can be H;
the X group represents a saturated or unsaturated and linear, cyclic or branched hydrocarbon chain comprising from 1 to 22 carbon atoms which is optionally substituted and which optionally comprises one or more heteroatoms, such as N, O or S, $C_5$-$C_{24}$ hydrocarbon rings and/or $C_4$-$C_{24}$ hydrocarbon heterocycles comprising one or more heteroatoms, such as N, O or S;
n, m and p are integers having a value of 0 or 1, independently of one another;

$$R_5\text{---}(COOH)_z \tag{V}$$

in which:
$R_5$ represents a linear or branched and saturated or unsaturated chain comprising from 4 to 68 carbon atoms, preferably from 4 to 54 carbon atoms, more preferably from 4 to 36 carbon atoms, and z is an integer varying from 2 to 4.

According to a preferred embodiment, the hydrocarbon oil is chosen from hydrocarbon oils of petroleum origin.

According to a preferred alternative form, the hydrocarbon oil is chosen from aromatic oils having a content of aromatic compounds of between 30% and 95% by weight, advantageously of between 50% and 95% by weight, more advantageously of between 60% and 95% by weight, with respect to the total weight of the aromatic oil.

According to another preferred alternative form, the hydrocarbon oil is chosen from paraffinic oils exhibiting a total content of paraffinic compounds of at least 50% by weight, with respect to the total weight of the paraffinic oil.

Advantageously, according to this alternative form, the paraffinic oil exhibits the respective contents:
(i) a total content of paraffinic compounds of between 50% and 90%;
(ii) a total content of naphthenic compounds of between 5% and 25%; and
(iii) a total content of aromatic compounds of between 5% and 25%, the percentages being expressed by weight with respect to the total weight of the paraffinic oil.

According to a preferred embodiment, the coating layer comprises from 80% to 99.9% of at least one oil, by weight, with respect to the total weight of the coating layer.

According to a preferred embodiment, the coating layer comprises from 0.1% to 10%, preferably from 0.2% to 5%, by weight, more preferably from 0.5% to 3.5%, by weight, of organogelator compound, with respect to the total weight of the coating layer.

According to a preferred embodiment, the core additionally comprises at least one compound chosen from the organogelator compounds.

According to another preferred embodiment, the core additionally comprises at least one pitch having a penetrability at 25° C. ranging from 0 to 20 1/10 mm and a ring-and-ball softening temperature (RBT) ranging from 115° C. to 175° C., it being understood that the penetrability is measured according to the standard EN 1426 and that the RBT is measured according to the standard EN 1427.

The invention also relates to a process for the manufacture of a bitumen as described above and in detailed fashion below, this process comprising:
i) the shaping of the core from at least one bitumen base,
ii) the coating of the core with a coating composition over all or part of its surface,
iii) optionally, the drying of the pellets obtained in stage ii) at a temperature ranging from 20 to 60° C., for a period of time ranging from 5 minutes to 5 hours, preferably from 5 minutes to 2 hours.

A further subject matter of the invention is a bituminous mix which comprises a bitumen as described above and in detailed fashion below and which additionally comprises aggregates and optionally inorganic and/or synthetic fillers.

According to a preferred embodiment, the bituminous mix is a road bituminous mix, a bituminous concrete or a bituminous mastic.

The invention also relates to a process for the manufacture of bituminous mixes comprising at least one road binder and aggregates, the road binder being chosen from the bitumens described above and in detailed fashion below, this process comprising at least the stages of:
heating the aggregates at a temperature ranging from 100° C. to 180° C., preferably from 120° C. to 160° C.,
mixing the aggregates with the road binder in a vessel, such as a mixer or a drum mixer,
obtaining bituminous mixes.

According to a preferred embodiment, the process does not comprise a stage of heating the road binder before it is mixed with the aggregates.

The invention also relates to a process for the transportation and/or storage of bitumen, said bitumen being transported and/or stored in the form of bitumen which is solid at ambient temperature, as described above and in detailed fashion below.

DETAILED DESCRIPTION

The objectives which the applicant company set itself were achieved by virtue of the development of bitumen compositions in a divided form, exhibiting a core/shell structure, in which the core is based on a bitumen and the coating layer is based on a gelled oily composition, and which confers, on the overall structure, improved properties in comparison with the bitumen aggregates known from the prior art.

The term "ambient temperature" is understood to mean the temperature resulting from the climatic conditions under which the road bitumen is transported and/or stored and/or handled. More specifically, the ambient temperature is equivalent to the temperature achieved during the transportation and/or storage and/or handling of the road bitumen, it being understood that the ambient temperature implies that no contribution of heat is contributed other than that resulting from the climatic conditions.

The invention relates to bitumens liable to be subjected to an elevated ambient temperature, in particular a temperature ranging up to 100° C., preferably from 20° C. to 80° C.

The term "bitumen which is solid at ambient temperature" is understood to mean a bitumen exhibiting a solid appearance at ambient temperature, whatever the conditions of transportation and/or of storage and/or of handling. More specifically, the term bitumen which is solid at ambient temperature is understood to mean a bitumen which retains its solid appearance throughout the transportation and/or storage and/or handling at ambient temperature, that is to say a bitumen which does not creep at ambient temperature under its own weight and, furthermore, which does not creep when it is subjected to forces of pressures resulting from the conditions of transportation and/or of storage and/or of handling.

The term "coating layer covering all or part of the surface of the core" is understood to mean that the coating layer covers at least 90% of the surface of the core, preferably at least 95% of the surface of the core and more preferably at least 99% of the surface of the core.

The term "penetrability" is understood here to mean the "needle penetrability" measurement, which is carried out by means of an NF EN 1426 standardized test at 25° C. (P25). This penetrability characteristic is expressed in tenths of a millimeter (dmm or ¹⁄₁₀ mm). The needle penetrability, measured at 25° C., according to the NF EN 1426 standardized test, represents the measurement of the penetration into a bitumen sample, after a time of 5 seconds, of a needle, the weight of which with its support is 100 g. The standard NF EN 1426 replaces the equivalent standard NF T 66-004 of December 1986 with effect on Dec. 20, 1999 (decision of the Director General of AFNOR dated Nov. 20, 1999).

The term "softening point" is understood to mean the "ring-and-ball softening point" measurement which is carried out by means of an NF EN 1427 standardized test. The ring-and-ball softening point corresponds to the temperature at which a steel ball of standard diameter, after having passed through the material to be tested (stuck in a ring), reaches the bottom of a standardized tank filled with a liquid which is gradually heated and in which the apparatus has been immersed.

The expression "consists essentially of", followed by one or more characteristics, means that, besides the components or stages explicitly listed, components or stages which do not significantly modify the properties and characteristics of the invention can be included in the process or the material of the invention.

The expression "of between X and Y" includes the limits, unless explicitly mentioned otherwise. This expression thus means that the interval targeted comprises the values X, Y and all the values ranging from X to Y.

A first subject matter of the invention relates to a bitumen which is solid at ambient temperature in the form of pellets comprising a core and a coating layer covering all or part of the surface of the core, in which:
the core comprises at least one bitumen base, and
the coating layer comprises at least:
one oil chosen from a hydrocarbon oil of petroleum or synthetic origin, and
one organogelator compound.

The Bitumen Base

Advantageously, the nucleus or core of the solid bitumen pellets according to the invention is prepared from a bitumen base, said core being prepared by bringing into contact:
one or more bitumen bases, and
optionally at least one organogelator compound,
optionally a pitch,
optionally at least one antiagglomerating compound.

Within the meaning of the invention, the terms "bitumen" and "road bitumen" are used equivalently and independently of one another. The term "bitumen" or "road bitumen" is understood to mean any bituminous composition composed of one or more bitumen bases and optionally comprising one or more additives. When said compositions are intended for a road application, they are more frequently denoted under the name of "road bitumen". The invention also has applications in other fields than the road field.

Mention may first of all be made, among the bitumen bases which can be used according to the invention, of bitumens of natural origin, those present in natural bitumen or natural asphalt deposits or bituminous sands and bitumens originating from the refining of crude oil. The bitumen bases according to the invention are advantageously chosen from bitumen bases originating from the refining of crude oil. The bitumen bases can be chosen from bitumen bases or mixtures of bitumen bases originating from the refining of crude oil, in particular bitumen bases containing asphaltenes or pitches. The bitumen bases can be obtained by conventional processes for the manufacture of bitumen bases in refining, in particular by direct distillation and/or vacuum distillation of oil. These bitumen bases can optionally be visbroken and/or deasphalted and/or air-rectified. It is standard to carry out the vacuum distillation of the atmospheric residues originating from the atmospheric distillation of crude oil. This manufacturing process consequently corresponds to the sequence of an atmospheric distillation and of a vacuum distillation, the feedstock supplying the vacuum distillation corresponding to the atmospheric residues. These vacuum residues resulting from the vacuum distillation tower can also be used as bitumens. It is also standard to inject air into a feedstock generally composed of distillates and of heavy products originating from the vacuum distillation of atmospheric residues originating from the distillation of oil. This process makes it possible to obtain a blown or semi-blown or oxidized or air-rectified or partially air-rectified base.

The various bitumen bases obtained by the refining processes can be combined with one another in order to obtain the best technical compromise. The bitumen base can also be a bitumen base from recycling. The bitumen bases can be bitumen bases of hard grade or of soft grade.

According to the invention, for conventional processes for the manufacture of bitumen bases, the operation is carried out at manufacturing temperatures of between 100° C. and 200° C., preferably between 140° C. and 200° C., more preferably between 140° C. and 170° C., and with stirring for a period of time of at least 10 minutes, preferably of between 30 minutes and 10 hours, more preferably between 1 hour and 6 hours. The term "manufacturing temperature" is understood to mean the heating temperature of the bitumen base or bases before mixing and also the mixing temperature. The temperature and the duration of the heating vary according to the amount of bitumen used and are defined by the standard NF EN 12594.

According to the invention, blown bitumens can be manufactured in a blowing unit by passing a stream of air and/or oxygen through a starting bituminous base. This operation can be carried out in the presence of an oxidation catalyst, for example phosphoric acid. Generally, the blowing is carried out at elevated temperatures, of the order of 200 to 300° C., for relatively long periods of time typically of between 30 minutes and 2 hours, continuously or batchwise. The period of time and the temperature for blowing are adjusted as a function of the properties targeted for the blown bitumen and as a function of the quality of the starting bitumen.

Preferably, the bitumen base employed to manufacture the pellets of the invention exhibits a needle penetrability, measured at 25° C. according to the standard EN 1426, of 5 to 330 $^1/_{10}$ mm, preferably of 20 to 220 $^1/_{10}$ mm.

In a well-known way, the "needle penetrability" measurement is carried out by means of an NF EN 1426 standardized test at 25° C. ($P_{25}$). This penetrability characteristic is expressed in tenths of a millimeter (dmm or $^1/_{10}$ mm). The needle penetrability, measured at 25° C., according to the NF EN 1426 standardized test, represents the measurement of the penetration of a needle, the weight of which with its support is 100 g, into a bitumen sample, after a time of 5 seconds. The standard NF EN 1426 replaces the equivalent standard NF T 66-004 of December 1986 with effect on Dec. 20, 1999 (decision of the Director General of AFNOR dated Nov. 20, 1999).

According to one embodiment of the invention, the bitumen base can also comprise at least one known elastomer for bitumen, such as SB (copolymer comprising blocks of styrene and butadiene), SBS (styrene/butadiene/styrene block copolymer), SIS (styrene/isoprene/styrene), SBS* (styrene/butadiene/styrene star block copolymer), SBR (styrene-b-butadiene rubber) or EPDM (ethylene/propylene/diene-modified) copolymers. In addition, these elastomers can be crosslinked according to any known process, for example with sulfur. Mention may also be made of the elastomers produced from styrene monomers and butadiene monomers which make possible crosslinking without a crosslinking agent, such as described in the documents WO2007/058994 and WO2008/137394 and by the applicant company in the patent application WO2011/013073.

Advantageously, according to this embodiment of the invention, the bituminous composition of which the core of the pellets is composed comprises from 0.5% to 15% by weight, preferably from 1% to 15% by weight, more preferably from 2% to 12% by weight, of elastomer, with respect to the total weight of the core bituminous composition.

According to one embodiment of the invention, the bituminous composition of which the core of the pellets is composed comprises at least one olefinic polymer adjuvant.

Advantageously, according to this embodiment, the bituminous composition of which the core of the pellets is composed comprises from 0.05% to 15% by weight, preferably from 0.1% to 10% by weight, more preferably from 0.5% to 6% by weight, of the olefinic polymer adjuvant, with respect to the total weight of said core.

According to one embodiment of the invention, the bituminous composition of which the core of the pellets is composed comprises at least one pitch.

Advantageously, according to this embodiment, the bituminous composition forming the core of the pellets comprises from 2% to 30% by weight of pitch, with respect to the total weight of the composition, preferably from 3% to 20% by weight of pitch, with respect to the total weight of the bituminous composition forming the core of the pellets.

According to one embodiment of the invention, the bituminous composition of which the core of the pellets is composed comprises at least one antiagglomerating agent.

Advantageously, according to this embodiment, the composition forming the core of the bitumen pellets comprises between 0.5% and 20% by weight, preferably between 2% and 20% by weight, more preferably between 4% and 15% by weight, of at least one antiagglomerating agent, with respect to the total weight of the bituminous composition forming the core of said pellets.

According to one embodiment of the invention, the bituminous composition of which the core of the pellets is composed comprises at least one organogelator agent.

Advantageously, according to this embodiment, the composition forming the core of the bitumen pellets comprises from 0.1% to 10% by weight, preferably from 0.2% to 5% by weight, more preferably from 0.5% to 3.5% by weight, of organogelator compound, with respect to the total weight of the bituminous composition forming the core of said pellets.

Olefinic Polymer Adjuvant:

The olefinic polymer adjuvant is preferably chosen from the group consisting of (a) ethylene/glycidyl (meth)acrylate copolymers; (b) ethylene/monomer A/monomer B terpolymers and (c) copolymers resulting from the grafting of a monomer B to a polymer substrate.

(a) The ethylene/glycidyl (meth)acrylate copolymers are advantageously chosen from random or block, preferably random, copolymers of ethylene and of a monomer chosen from glycidyl acrylate and glycidyl methacrylate, comprising from 50% to 99.7% by weight, preferably from 60% to 95% by weight, more preferentially from 60% to 90% by weight, of ethylene.

(b) The terpolymers are advantageously chosen from random or block, preferably random, terpolymers of ethylene, of a monomer A and of a monomer B.

The monomer A is chosen from vinyl acetate and $C_1$ to $C_6$ alkyl acrylates or methacrylates.

The monomer B is chosen from glycidyl acrylate and glycidyl methacrylate.

The ethylene/monomer A/monomer B terpolymers comprise from 0.5% to 40% by weight, preferably from 5% to 35% by weight, more preferably from 10% to 30% by weight, of units resulting from the monomer A and from 0.5% to 15% by weight, preferably from 2.5% to 15% by weight, of units resulting from the monomer B, the remainder being formed of units resulting from ethylene.

(c) The copolymers resulting from the grafting of a monomer B, chosen from glycidyl acrylate and glycidyl methacrylate, to a polymer substrate. The polymer substrate consists of a polymer chosen from polyethylenes, in particular low-density polyethylenes, polypropylenes, random or block, preferably random, copolymers of ethylene and of vinyl acetate, and random or block, preferably random, copolymers of ethylene and of $C_1$ to $C_6$ alkyl acrylate or methacrylate, comprising from 40% to 99.7% by weight, preferably from 50% to 99% by weight, of ethylene. Said grafted copolymers comprise from 0.5% to 15% by weight, preferably from 2.5% to 15% by weight, of grafted units resulting from the monomer B.

Advantageously, the olefinic polymer adjuvant is chosen from random terpolymers (b) of ethylene, of a monomer A chosen from $C_1$ to $C_6$ alkyl acrylates or methacrylates and of a monomer B chosen from glycidyl acrylate and glycidyl methacrylate, comprising from 0.5% to 40% by weight, preferably from 5% to 35% by weight, more preferably from 10% to 30% by weight, of units resulting from the monomer A and from 0.5% to 15% by weight, preferably from 2.5% to 15% by weight, of units resulting from the monomer B, the remainder being formed of units resulting from ethylene.

The Pitch:

The bitumen base is chemically different from the pitch used. Consequently, the bitumen base and the pitch cannot be used as replacement for one another as their chemical characteristics are different. The pitch can be used as a mixture in the bitumen base.

According to one embodiment of the invention, the pitch is a blown pitch. According to the invention, use will be made, independently of one another, of the terms "blown pitch" and "oxidized pitch".

According to the dictionary, the term "pitch" is understood to mean a residue from the distillation of tars from oil, from coal, from wood or from other organic molecules.

The pitch used in the invention is chosen from the residues from the distillation of oil, also known as "oil pitch".

In the description, use will be made, independently of one another, of the terms "pitch", "oil pitch" and "deasphalting pitch".

The pitches can be obtained by conventional manufacturing processes in a refinery. The manufacturing process corresponds to the sequence of an atmospheric distillation and of a vacuum distillation. In a first step, the crude oil is subjected to a distillation at atmospheric pressure, which results in a gas phase, different distillates and an atmospheric distillation residue being obtained. The residue from the atmospheric distillation is then itself subjected to a distillation under reduced pressure, known as vacuum distillation, which makes it possible to separate a heavy diesel oil, various distillate fractions and a vacuum distillation residue. This vacuum distillation residue contains "oil pitch" in a variable concentration.

It is possible to obtain the "oil pitch" according to two processes:

$1^{st}$ Process:

The vacuum distillation residue is subjected to a deasphalting operation by addition of an appropriate solvent, such as propane, which thus makes it possible to precipitate the pitch and to separate it from the light fractions, such as the deasphalted oil.

$2^{nd}$ Process:

The vacuum distillation residue is subjected to solvent extraction and more specifically to extraction with furfural. This heterocyclic aldehyde exhibits the distinguishing feature of selectively dissolving the aromatic and polycyclic compounds. This process thus makes it possible to remove the aromatic extracts and to recover the "oil pitch".

According to one embodiment, the pitch is an oxidized pitch.

Preferably, the oxidized pitch used according to the invention is obtained by oxidation of a mixture comprising pitch and a diluant, such as a light gasoline, also known as "flux", subjected to an oxidation operation in a blowing tower in the presence of a catalyst, at a fixed temperature and at a given pressure.

For example, oxidized pitches can be manufactured in a blowing unit by passing a stream of air and/or oxygen through a starting pitch. This operation can be carried out in the presence of an oxidation catalyst, for example phosphoric acid. Generally, the oxidation is carried out at elevated temperatures, of the order of 200 to 300° C., for relatively long periods of time typically of between 30 minutes and 2 hours, continuously or batchwise. The period of time and the temperature for oxidation are adjusted as a function of the properties targeted for the oxidized pitch and as a function of the quality of the starting pitch.

The mechanical qualities of the pitches are generally assessed by determining a series of mechanical characteristics by standardizsed tests, the most widely used of which are the needle penetrability, expressed in $\frac{1}{10}$ mm, and the softening point determined by the ring-and-ball test, also known as ring-and-ball softening temperature (RBT).

According to one embodiment of the invention, the pitch exhibits a needle penetrability at 25° C. of 0 to 20 $\frac{1}{10}$ mm, preferably of 0 to 15 $\frac{1}{10}$ mm, more preferably of 0 to 10 $\frac{1}{10}$ mm, it being understood that the penetrability is measured according to the standard EN 1426.

According to one embodiment of the invention, the pitch exhibits a softening point of between 115° C. and 175° C. Among examples of pitches used in the invention, there are pitches respectively exhibiting a softening point of between 115 and 125° C., between 135 and 145° C. or also between 165 and 175° C.

The addition of a pitch with the mechanical characteristics presented above to a bituminous composition comprising the core of the pellets of the invention makes it possible to improve the modulus properties of said bituminous composition and also to improve the modulus properties of the bituminous mixes. Furthermore, the addition of the pitch according to the invention to a bituminous composition composing the core of the pellets of the invention makes it possible to reduce the penetrability and to increase the ring-and-ball softening temperature of said bituminous composition while maintaining the viscosity of said bituminous composition, in comparison with a pitch-free bituminous composition.

The bituminous composition composing the core of the pellets of the invention can be prepared by a process comprising at least the stages of:
heating the bitumen base to a temperature ranging from 140 to 180° C.,
introducing the pitch into the bitumen base,
stirring the mixture at a temperature ranging from 140 to 180° C. until a homogeneous mixture is obtained.

It was found that the pitch mixes perfectly with the bitumen base.

According to one embodiment of the invention, the pitch is provided in the form of pellets before it is introduced into the heated bitumen base. Such an embodiment facilitates the handling of the components and the implementation of the process.

Advantageously, the tar does not have to be heated, before being added to the bitumen base. Although the pitch usually has a melting point of greater than 220° C., it dissolves in the bitumens at the normal temperatures for the preparation of the bituminous compositions. The process for the manufacture of the bituminous composition composing the core of the pellets of the invention is easy to carry out and does not require transporting under hot conditions over long distances the pitch intended to improve the properties of the bitumen base.

According to one embodiment of the invention, the pitch used in the process for the production of the core of the pellets is in the solid form under cold conditions and in divided form, preferably in the form of pellets. This form facilitates the handling of the pitch for the use thereof in the manufacture of the bituminous composition composing the core of the pellets of the invention.

The term "pitch which is solid under cold conditions and in divided form" is understood to mean a pitch which is solid at ambient temperature and which is packaged in a divided form, that is to say in the form of units which are distinct from one another, for example pellets.

The pitch pellets can have, within one and the same population of pellets, one or more shapes chosen from a cylindrical, spherical or oval shape. More specifically, the pitch pellets preferably have a cylindrical or spherical shape.

Advantageously, the size of the pitch pellets is such that the longest mean dimension is preferably less than or equal to 50 mm, more preferably from 2 to 30 mm. For example, the use of a die makes it possible to control the manufacture of pellets of a chosen size. A sieving makes it possible to select pellets according to their size.

In order to make possible the formation of pitch pellets which do not adhere together and which withstand compression during their storage, it can be advantageous to use pitch pellets coated, over all or part of their surface, with an antiagglomerating compound. The pitch, in the form of pellets optionally covered with an antiagglomerating compound, can be easily handled after a prolonged period of time of transportation and/or of storage. The antiagglomerating compound is then found in the composition forming the core of the pellets.

Antiagglomerating Agent:

The antiagglomerating compound can be used as additive in the composition from which the core of the pellets is formed.

The antiagglomerating compound can also be used as additive in the coating composition.

It can also, optionally, be used to form a second coating layer, over all or part of the surface of the pellets.

The antiagglomerating compound is of inorganic or organic origin.

More preferably, the antiagglomerating compound is chosen from: talc; fines, also known as fillers, generally with a diameter of less than 125 µm, such as siliceous fines, with the exception of limestone fines; ultrafines; sand, such as Fontainebleau sand; cement; carbon; wood residues, such as lignin, lignosulfonate, conifer needle powders or conifer cone powders, in particular of pine; rice husk ash; glass powder; clays, such as kaolin, bentonite or vermiculite; alumina, such as alumina hydrates; silica; silica derivatives, such as silicates, silicon hydroxides and other silicon oxides; fumed silica; plastic powder; lime; plaster; rubber compost; polymer powder, where the polymers are such as styrene/butadiene (SB) copolymers or styrene/butadiene/styrene (SBS) copolymers, and the mixtures of these materials.

Advantageously, the antiagglomerating compound is chosen from: fines, generally with a diameter of less than 125 µm; fumed silica; wood residues, such as lignin, conifer needle powders and conifer cone powders; their mixtures.

By way of example, the agglomeration inhibitor can be chosen from fumed silica.

The antiagglomerating compound is preferably chosen from fumed silica.

In particular, when the composition from which the core of the pellets is formed comprises at least one antiagglomerating compound, it is preferably chosen from fumed silica.

When the pellets according to the invention are coated, over all or part of their surface, with a coating layer comprising an antiagglomerating compound, said antiagglomerating compound is preferably chosen from fumed silica.

According to one embodiment, the core of the pellets is composed of a composition comprising at least one antiagglomerating agent, preferably chosen from fumed silica, and the surface of said pellets is covered, at least in part, with a coating layer comprising an antiagglomerating compound, preferably chosen from fumed silica.

Within the meaning of the invention, the compounds "fumed silica" and "pyrogenic silica" have the same chemical definition and are recorded under the same number CAS 112 945-52-5. Consequently, within the meaning of the invention, these compounds can be employed without distinction from one another.

The term "pyrogenic silica" is understood to mean either a pyrogenic silica or a pyrogenic silica derivative.

The term "pyrogenic silica" is understood to mean a compound obtained by the vapor-phase hydrolysis of chlorosilanes, such as silicon tetrachloride, in a flame of oxygen and hydrogen. Such processes are generally denoted as pyrogenic processes, the overall reaction of which is: $SiCl_4 + H_2 + O_2 \rightarrow SiO_2 + 4\ HCl$.

Pyrogenic silicas are distinguished from the other silicon dioxides in that they exhibit an amorphous structure. Of high purity (>99.8% silica), they exhibit a weak hydrophilic nature (no microporosity).

Preferably, the pyrogenic silica compound is pyrogenic silica.

According to one embodiment of the invention, the pyrogenic silica compound exhibits a specific surface of between 25 and 420 m²/g, preferably between 90 and 330 m²/g, more preferably between 120 and 280 m²/g.

The specific surface of the pyrogenic silica, defined in m²/g, commonly known as "surface area" or "SA", is measured according to the method of S. Brunauer, P. H. Emmett and I. Teller, Journal of the American Chemical Society, 60, 309 (1938) (BET).

According to one embodiment of the invention, the pyrogenic silica compound exhibits a mean particle size of between 5 and 50 nm.

According to one embodiment of the invention, the pyrogenic silica compound exhibits a pH of between 3 and 10, when it is in the aqueous phase.

According to one embodiment of the invention, the pyrogenic silica compound exhibits a carbon content of between 0.1% and 10% by weight, with respect to the total weight of the pyrogenic silica compound.

According to one embodiment of the invention, the pyrogenic silica compound is chosen from a hydrophilic pyrogenic silica compound, a hydrophobic pyrogenic silica compound and their mixtures.

Preferably, the pyrogenic silica compound is a hydrophilic pyrogenic silica compound.

The term "hydrophilic" is understood to mean a compound which is miscible with water in all proportions.

The pyrogenic silica compound, or pyrogenic silica derivative, used within the meaning of the invention can be chemically modified.

Different types of pyrogenic silica compounds are described in the following patent applications and can be used in the present invention:

silanized pyrogenic silicas, as described in WO 2004/020532 or in WO 2007/128636, hydrophilic pyrogenic silicas, as described in WO 2009/071467 and WO 2011/000133, filed on behalf of Degussa AG or Degussa GmbH, fumed silicas rendered hydrophobic by a treatment by means of polysiloxanes, as described in WO 2008/141932, or by silanization, as described in WO 2008/141930, silicas doped with potassium oxide, as described in WO 2008/043635 and WO 2008/022836, silicas in the form of aggregates of primary particles, as described in WO 2009/015969, filed on behalf of Evonik Degussa GmbH, or in WO 2010/028261, filed on behalf of Cabot Corporation.

When the surface of the pellets is covered, at least in part, with a coating layer comprising a pyrogenic silica compound, said pyrogenic silica compound can then be employed alone or in the form of a mixture within a coating composition.

Whether it is employed alone or as a mixture in a composition, the pyrogenic silica compound can be employed in the process according to the invention in the form of a powder or as a dispersion in a solvent which evaporates after application.

Preferably, when the coating composition comprises at least one pyrogenic silica compound and at least one solvent, the composition comprises from 5% to 70% by weight of pyrogenic silica compound, with respect to the total weight of the coating composition, more preferably from 20% to 40% by weight.

Preferably, the solvent is an organic solvent or water. The term "organic solvent" is understood to mean any solvent which is immiscible with a bitumen, such as an alcohol, for example ethanol.

The fumed silicas used in the invention are commercially available and may, for example, be sold by Evonik Degussa under the Aerosil® brand, such as, for example, Aerosil® 200, by Cabot Corporation under the Cab-a-Sil® and Cab-a-Sperse® brands or else by Wacker Chemie AG under the HDK® brand.

the Composition Forming the Core of the Pellets:

The composition forming the core of the pellets comprises:

one or more bitumen bases, and optionally at least one organogelator compound, optionally a pitch.

Optionally, it can also comprise one or more additives chosen from elastomers, olefinic polymer adjuvants and antiagglomerating compounds.

Advantageously, the composition forming the core of the pellets, comprising a bitumen base additivated with at least one organogelator compound and/or at least one pitch, exhibits a targeted penetrability ranging from 5 to 45 ¹/₁₀ mm and/or a targeted ring-and-ball softening temperature (RBT) of greater than or equal to 90° C., it being understood that the penetrability is measured at 25° C. according to the standard EN 1426 and the RBT according to the standard EN 1427.

These characteristics are achieved by methods known to a person skilled in the art by mixing, under hot conditions, the different component or components in the bitumen base in the appropriate amounts as indicated above for each category of component. The temperature of the bitumen base during the introduction of the additives is chosen as a function of their natures, in order to prevent them from decomposing. The stirring is more or less vigorous and more or less prolonged, in order to obtain a homogeneous composition, without damaging the properties of the composition forming the core of the pellets.

The composition thus obtained is used directly in the process for the manufacture of the bitumen pellets having a core/shell structure described below.

Advantageously, the bituminous composition forming the core of the pellets comprises:

one or more bitumen bases, between 0.1% and 5% by weight, preferably between 0.5% and 4% by weight, more preferably between 0.5% and 2.5% by weight, of at least one organogelator compound, with respect to the total weight of bitumen of said pellets.

Advantageously, the bituminous composition forming the core of the pellets comprises:

one or more bitumen bases, between 0.1% and 5% by weight, preferably between 0.5% and 4% by weight, more preferably between 0.5% and 2.5% by weight, of at least one organogelator compound, with respect to the total weight of bitumen of said pellets, and between 0.5% and 20% by weight, preferably between 2% and 20% by weight, more preferably between 4% and 15% by weight, of at least one antiagglomerating compound, with respect to the total weight of bitumen of said pellets.

The Oil:

Preferably, the oil is a hydrocarbon oil of petroleum origin. It can be of aromatic or paraffinic type.

According to one embodiment, the oil is composed of 90% to 100% by weight of at least one hydrocarbon oil of petroleum origin, advantageously of 95% to 100%, better still of 98% to 100%, by weight of at least one hydrocarbon oil of petroleum origin. More advantageously still, the oil consists of a hydrocarbon oil of petroleum origin or of a mixture of hydrocarbon oils of petroleum origin.

In a preferred embodiment of the invention, the hydrocarbon oil of petroleum origin is chosen from aromatic oils.

More preferably, the aromatic oils have a content of aromatic compounds of between 30% and 95% by weight, advantageously of between 50% and 95% by weight, more advantageously of between 60% and 95% by weight, with respect to the total weight of the aromatic oil (SARA: Saturates/Aromatics/Resins/Asphaltenes method).

More preferably, the aromatic oils have a content of saturated compounds of between 1% and 20% by weight, advantageously of between 3% and 15% by weight, more advantageously of between 5% and 10% by weight (SARA: Saturates/Aromatics/Resins/Asphaltenes method).

More preferably, the aromatic oils have a content of resin-based compounds of between 1% and 10% by weight, advantageously of between 3% and 5% by weight (SARA: Saturates/Aromatics/Resins/Asphaltenes method).

The contents of saturated, resin-based and aromatic compounds mentioned in the present patent application are determined according to the standard ASTM D2140, as % by weight with respect to the weight of the oil.

More preferably, the aromatic oils have a kinematic viscosity at 100° C. of between 0.1 and 150 mm$^2$/s, advantageously of between 5 and 120 mm$^2$/s, more advantageously of between 7 and 90 mm$^2$/s (ASTM D 445 method).

More preferably, the aromatic oils have a Cleveland flash point of greater than or equal to 150° C., advantageously of between 150° C. and 600° C. more advantageously of between 200° C. and 400° C. (EN ISO 2592 method).

More preferably, the aromatic oils have an aniline point of between 20° C. and 120° C., advantageously of between 40° C. and 120° C. (ASTM D611 method).

More preferably, the aromatic oils have a density at 15° C. of between 400 kg/m$^3$ and 1500 kg/m$^3$, advantageously of between 600 kg/m$^3$ and 1200 kg/m$^3$, more advantageously of between 800 kg/m$^3$ and 1000 kg/m$^3$ (ASTM D4052 method).

According to this advantageous embodiment, the aromatic oil comprises aromatic extracts of petroleum residues, obtained by extraction or dearomatization of residues from distillations of petroleum cuts.

The aromatic extracts are byproducts of the process for the refining of crude oils, obtained in particular from products of the vacuum distillation of atmospheric residues. They result from a simple or from a double extraction of the raffinate upgradable in lubricants, by means of a polar solvent.

The different extracts are classified in different categories as a function of their process of production and are as follows:
DAE (Distillate Aromatic Extract) products,
MES (Mild Extract Solvate) products,
TDAE (Treated Distillate Aromatic Extract) products,
RAE (Residual Aromatic Extract) products,
TRAE (Treated Residual Aromatic Extract) products.

For example, the aromatic oils which can be used according to the invention can be chosen from the following products sold by Total under the names: Plaxolene 50® (also sold under the trade name Régénis 50®), Plaxolene TD346® and Plaxolene MS132®.

The respective contents of paraffinic, naphthenic and aromatic compounds depend to a certain extent on the nature of the crude oil which is the source of the aromatic oil and on the refining process used.

According to one embodiment, the oil is composed of 90% to 100% by weight of at least one oil of aromatic petroleum origin and of 0% to 10% by weight of one or more other oils.

For example, Régénis 50® is an RAE (Residual Aromatic Extract) which exhibits:
a density at 15° C. of between 980 kg/and 1010 kg/m$^3$ (ASTM D4052 method),
a (Cleveland) flash point of approximately 230° C. (EN ISO 2592 method),
a kinematic viscosity at 100° C. of between 60 and 85 mm$^2$/s (ASTM D 445 method),
an aniline point of between 53 and 65° C. (ASTM D611 method).

For example, Plaxolene TD346® is a TDAE (Treated Distillates Aromatic Extract) which exhibits:
a density at 15° C. of between 940 kg/m$^3$ and 970 kg/m$^3$ (ASTM D4052 method),
a (Cleveland) flash point of approximately 220° C. (EN ISO 2592 method),
a kinematic viscosity at 100° C. of between 16 and 23 mm$^2$/s (ASTM D 445 method),
an aniline point of between 64 and 72° C. (ASTM D611 method).

For example, Plaxolene MS132® is an MES (Mild Extract Solvate) which exhibits:
a density at 15° C. of between 895 kg/m$^3$ and 925 kg/m$^3$ (ASTM D4052 method),
a (Cleveland) flash point of approximately 230° C. (EN ISO 2592 method),
a kinematic viscosity at 100° C. of between 13 and 17 mm$^2$/s (ASTM D 445 method),
an aniline point of between 85 and 100° C. (ASTM D611 method).

According to a second advantageous embodiment, the oil is a paraffinic oil predominantly comprising paraffinic extracts of petroleum residues. According to this specific embodiment, advantageously, the oil comprises a total content of paraffinic compounds of at least 50% by weight, preferably of at least 60% by weight, for example of between 50% and 90%, preferably between 60% and 90%, more preferably between 50% and 80% and in particular of between 55% and 70% or in particular of between 60% and 75%.

In a more specific embodiment, the oil additionally contains a total content of naphthenic compounds which does not exceed 25%, for example of between 5% and 25% and in particular of between 10% and 25%.

In a more specific embodiment, the oil additionally contains a total content of aromatic compounds which does not exceed 25%, for example of between 5% and 25% and in particular of between 8% and 18%.

In a particularly preferred form, the oil is a paraffinic oil, comprising the respective contents:
(i) a total content of paraffinic compounds of between 50% and 90%;
(ii) a total content of naphthenic compounds of between 5% and 25%; and
(iii) a total content of aromatic compounds of between 5% and 25%.

In a more particularly preferred embodiment, the oil is a paraffinic oil, comprising the respective contents:

(i) a total content of paraffinic compounds of between 60% and 75%;
(ii) a total content of naphthenic compounds of between 5% and 25%; and
(iii) a total content of aromatic compounds of between 5% and 25%.

In a more preferred embodiment, the oil is a DAO paraffinic oil, comprising the respective contents:
(i) a total content of paraffinic compounds of between 60% and 75%;
(ii) a total content of naphthenic compounds of between 15% and 25%; and
(iii) a total content of aromatic compounds of between 10% and 15%.

In a preferred embodiment of the invention, the paraffinic oils result from the deasphalting cuts from the distillation under reduced pressure (vacuum residue VR) of crude oil (hereinafter denoted "DAO oil"). The principal of deasphalting rests on a separation by precipitation of a petroleum residue into two phases: i) a "deasphalted oil" phase, also known as "oil matrix" or "oil phase" or DAO (DeAsphalted Oil); and ii) an "asphalt" phase.

Oils corresponding to the characteristics below and which can be used according to the invention are obtained by the processes for the deasphalting of the vacuum residues (VRs) resulting from the refining of oil, for example by a deasphalting using a $C_3$ to $C_6$ solvent, preferably with propane. Deasphalting processes are well known to a person skilled in the art and are described, for example, in FR 3 014 111, US 2004/0069685, U.S. Pat. Nos. 4,305,812 and 4,455,216 or in Lee et al., 2014, Fuel Processing Technology, 119, 204-210.

In Lee et al., 2014, Fuel Processing Technology, 119, 204-210, the residues resulting from the vacuum distillation (VRs) are separated according to their molecular weight in the presence of $C_3$ to $C_6$ solvent (for example propane). The "DAO" oil thus obtained is rich in paraffin, exhibits a very low content of asphaltenes, has an evaporation temperature of between 440° C. and 750° C. and has a much greater API gravity than that of the vacuum residues The API (American Petroleum Institute) gravity or API density of an oil can be obtained from the following formula (1):

$$G_{API} = \frac{141.5}{d} - 131.5$$

with:
$G_{API}$, the API gravity of the oil under consideration (expressed without unit), and
d, the density at 16° C. (60° F.) of the oil under consideration (expressed without unit), taking water as reference.

The respective contents of paraffinic, naphthenic and aromatic compounds depend to a certain extent on the nature of the crude oil which is the source of the DAO oil and on the refining process used. A person skilled in the art knows how to determine the respective contents of paraffinic, naphthenic and aromatic compounds of a DAO oil, for example using the SARA fractionation method, also described in Lee et al., 2014, Fuel Processing Technology, 119, 204-210, and to thus select the DAO oil appropriate for the preparation of the gelled oil composition according to the invention.

The contents of paraffinic, naphthenic and aromatic compounds mentioned in the present patent application are determined according to the standard ASTM D2140, as % by weight with respect to the weight of the oil.

According to an advantageous embodiment, the oil is composed of a mixture based on an aromatic hydrocarbon oil and on a paraffinic oil.

According to an advantageous embodiment, the oil is composed of 90% to 100% by weight of at least one aromatic oil, preferably an RAE oil, and of 0% to 10% by weight of one or more other oils.

According to an advantageous embodiment, the oil is composed of 90% to 100% by weight of at least one paraffinic oil, preferably a DAO oil, and of 0% to 10% by weight of one or more other oils.

Preferably, the oil is a paraffinic oil, advantageously a DAO paraffinic oil.

The other oils used can be chosen from oils of petroleum origin, oils of vegetable origin and their mixtures.

For example, the oils of vegetable origin can be chosen from rapeseed, sunflower, soybean, linseed, olive, palm, castor, wood, corn, pumpkin, grape seed, jojoba, sesame, walnut, hazelnut, almond, shea, macadamia, cottonseed, alfalfa, rye, safflower, peanut, coconut and copra oils, and their mixtures.

The Organogelator Compound

The coating layer of the bitumen which is solid at ambient temperature in the form of pellets according to the invention comprises at least one organogelator compound.

The core of the bitumen which is solid at ambient temperature in the form of pellets according to the invention can also comprise at least one organogelator compound.

In particular, the coating layer comprises at least one organogelator compound in an amount appropriate for this composition to form a coating which is solid at ambient temperature.

Preferably, the composition forming the core of the pellets of bitumen which is solid at ambient temperature comprises at least one organogelator compound in an amount appropriate for this composition to be solid at ambient temperature and in a divided form.

In one embodiment of the invention, the organogelator is an organic compound. Advantageously, the organogelator compound exhibits a molar mass of less than or equal to 2000 g·mol$^{-1}$, preferably a molar mass of less than or equal to 1000 g·mol$^{-1}$.

In this embodiment, according to a first alternative form, the organogelator compound is a compound of general formula (I):

Ar1-R$_1$—Ar2 (I), in which:
Ar1 and Ar2 represent, independently of one another, a benzene nucleus or a system of condensed aromatic nuclei of 6 to 20 carbon atoms which are substituted by at least one hydroxyl group and optionally substituted by one or more C$_1$-C$_{20}$ alkyl groups, and
R$_1$ represents an optionally substituted divalent radical, the main chain of which comprises from 6 to 20 carbon atoms and at least one group chosen from the amide, ester, hydrazide, urea, carbamate and anhydride functional groups.

Preferably, Ar1 and/or Ar2 are substituted by at least one alkyl group of 1 to 10 carbon atoms, advantageously in one or more ortho positions with respect to the hydroxyle group(s); more preferably, Ar1 and Ar2 are 3,5-dialkyl-4-hydroxyphenyl groups, advantageously 3,5-di(tert-butyl)-4-hydroxyphenyl groups.

Preferably, $R_1$ is in the para position with respect to a hydroxyl group of Ar1 and/or Ar2.

Mention may be made, as example of compound of formula (I), of 2',3-bis[(3-[3,5-di(tert-butyl)-4-hydroxyphenyl]propionyl)]propionohydrazide.

According to a second alternative form of this embodiment, the organogelator compound is a compound of general formula (II):

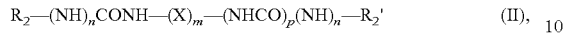

in which:
- the $R_2$ and $R_2'$ groups, which are identical or different, represent a saturated or unsaturated and linear, branched or cyclic hydrocarbon chain comprising from 1 to 22 carbon atoms which is optionally substituted by one or more hydroxyl groups or amine groups and which optionally comprises heteroatoms, such as N, O or S, $C_5$-$C_{24}$ hydrocarbon rings and/or $C_4$-$C_{24}$ hydrocarbon heterocycles comprising one or more heteroatoms, such as N, O or S, and $R_2'$ can be H;
- the X group represents a saturated or unsaturated and linear, cyclic or branched hydrocarbon chain comprising from 1 to 22 carbon atoms which is optionally substituted and which optionally comprises heteroatoms, such as N, O or S, $C_5$-$C_{24}$ hydrocarbon rings and/or $C_4$-$C_{24}$ hydrocarbon heterocycles comprising one or more heteroatoms, such as N, O or S;
- n, m and p are integers having a value of 0 or 1, independently of one another.

According to this alternative form, when the integer m has a value of 0 and when the integer p has a value of 1, then the $R_2$—$(NH)_n$CONH and NHCO$(NH)_n$—$R_2'$ groups are covalently bonded and together form a hydrazide CONH—NHCO bond. The $R_2$ group or the $R_2'$ group then represents at least one group chosen from: a hydrocarbon chain of at least 4 carbon atoms, an aliphatic ring of 3 to 8 atoms and a condensed aliphatic, partially aromatic or completely aromatic polycyclic system, each ring comprising 5 or 6 atoms.

Still according to this alternative form, when the integer m has a value of 1, then the $R_2$ group, the $R_2'$ group and/or the X group represents at least one group chosen from: a hydrocarbon chain of at least 4 carbon atoms, an aliphatic ring of 3 to 8 atoms and a condensed aliphatic, partially aromatic or completely aromatic polycyclic system, each ring comprising 5 or 6 atoms.

Preferably, the $R_2$ and/or $R_2'$ group represents an aliphatic hydrocarbon chain of 4 to 22 carbon atoms, in particular, chosen from the $C_4H_9$, $C_5H_{11}$, $C_9H_{19}$, $C_{11}H_{23}$, $C_{12}H_{25}$, $C_{17}H_{35}$, $C_{18}H_{37}$, $C_{21}H_{43}$ and $C_{22}H_{45}$ groups.

According to a first preferred embodiment, the X group represents a saturated linear hydrocarbon chain comprising from 1 to 22 carbon atoms, advantageously from 1 to 12 carbon atoms and better still from 1 to 10 carbon atoms. Preferably, the X group is chosen from the $C_2H_4$ and $C_3H_6$ groups.

According to a second preferred embodiment, the X group can also be a cyclohexyl group or a phenyl group; the $R_2$—$(NH)_n$CONH— and —NHCO$(NH)_n$—$R_2'$ radicals can then be in the ortho, meta or para position. Furthermore, the $R_2$—$(NH)_n$CONH— and —NHCO$(NH)_n$—$R_2'$ radicals can be in the cis or trans position with respect to one another. Furthermore, when the X radical is cyclic, this ring can be substituted by other groups then the two main groups $R_2$—$(NH)_n$CONH— and —NHCO$(NH)_n$—$R_2'$.

According to a third preferred embodiment, the X group represents two rings of 6 carbons which are optionally substituted and which are connected by a $CH_2$ group, these rings being aliphatic or aromatic. In this case, the X group is, for example:

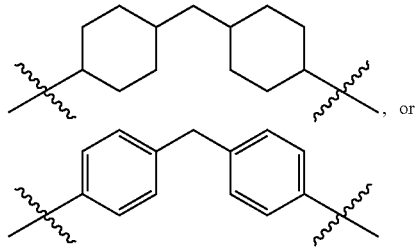

Advantageously, according to this alternative form, the organogelator compound is a compound of general formula (II) chosen from hydrazide derivatives, such as the compounds $C_5H_{11}$—CONH—NHCO—$C_5H_{11}$, $C_9H_{19}$—CONH—NHCO—$C_9H_{19}$, $C_{11}H_{23}$—CONH—NHCO—$C_{11}H_{23}$, $C_{17}H_{35}$—CONH—NHCO—$C_{17}H_{35}$ or $C_{21}H_{43}$—CONH—NHCO—$C_{21}H_{43}$, diamides, such as le N,N'-ethylenedi(laurylamide) of formula $C_{11}H_{23}$—CONH—$CH_2$—$CH_2$—NHCO—$C_{11}H_{31}$, N,N'-ethylenedi(myristylamide) of formula $C_{13}H_{27}$—CONH—$CH_2$—$CH_2$—NHCO—$C_{13}H_{27}$, N,N'-ethylenedi(palmitamide) of formula $C_{15}H_{31}$—CONH—$CH_2$—$CH_2$—NHCO—$C_{15}H_{31}$ or N,N'-ethylenedi(stearamide) of formula $C_{17}H_{35}$—CONH—$CH_2$—$CH_2$—NHCO—$C_{17}H_{35}$; and ureide derivatives, such as 4,4'-bis(dodecylaminocarbonylamino)diphenylmethane of formula $C_{12}H_{25}$—NHCONH—$C_6H_4$—$CH_2$—$C_6H_4$—NHCONH—$C_{12}H_{25}$.

Preferably, the compound of general formula (II) is chosen from those which satisfy the condition n=0.

Preferably, the compound of general formula (II) is chosen from those which satisfy the condition: the sum of the numbers of the carbon atoms of $R_2$, X and $R_2'$ is greater than or equal to 10, advantageously greater than or equal to 14, preferably greater than or equal to 18.

Preferably, the compound of general formula (II) is chosen from those which satisfy the condition: the number of the carbon atoms of at least one of $R_2$ and $R_2'$ is greater than or equal to 10, advantageously greater than or equal to 12, preferably greater than or equal to 14.

Preferably, according to a first alternative form, the compound of general formula (II) is chosen from those of formula (IIA):

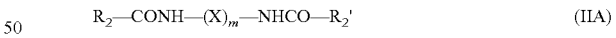

in which $R_2$, $R_2'$, m and X have the same definitions as above.

Preferably, in the formula (IIA), when m=1, the X group represents a saturated linear hydrocarbon chain comprising from 1 to 22 carbon atoms; advantageously, X represents a saturated linear hydrocarbon chain comprising from 1 to 12 carbon atoms and better still from 1 to 4 carbon atoms. Preferably, the X group is chosen from the $C_2H_4$ and $C_3H_6$ groups.

Preferably, the compound of general formula (IIA) is chosen from those which satisfy the condition: the sum of the numbers of the carbon atoms of $R_2$, X and $R_2'$ is greater than or equal to 10, advantageously greater than or equal to 14, preferably greater than or equal to 18.

Preferably, the compound of general formula (IIA) is chosen from those which satisfy the condition: the number of the carbon atoms of at least one of $R_2$ and $R_2'$ is greater than or equal to 10, advantageously greater than or equal to 12, preferably greater than or equal to 14.

More preferably, according to this alternative form, the compound of general formula (IIA) is chosen from hydrazide derivatives, such as the compounds $C_5H_{11}$—CONH—NHCO—$C_5H_{11}$, $C_9H_{19}$—CONH—NHCO—$C_9H_{19}$, $C_{11}H_{23}$—CONH—NHCO—$C_{11}H_{23}$, $C_{17}H_{35}$—CONH—NHCO—$C_{17}H_{35}$ or $C_{21}H_{43}$—CONH—NHCO—$C_{21}H_{43}$, diamides, such as N,N'-ethylenedi(laurylamide) of formula $C_{11}H_{23}$—CONH—$CH_2$—$CH_2$—NHCO—$C_{11}H_{31}$, N,N'-ethylenedi(myristylamide) of formula $C_{13}H_{27}$—CONH—$CH_2$—$CH_2$—NHCO—$C_{13}H_{27}$, N,N'-ethylenedi(palmitamide) of formula $C_{15}H_{31}$—CONH—$CH_2$—$CH_2$—NHCO—$C_{15}H_{31}$ or N,N'-ethylenedi(stearamide) of formula $C_{17}H_{35}$—CONH—$CH_2$—$CH_2$—NHCO—$C_{17}H_{35}$; monoamides, such as laurylamide of formula $C_{11}H_{23}$—$CONH_2$, myristylamide of formula $C_{13}H_{27}$—$CONH_2$, palmitamide of formula $C_{15}H_{31}$—$CONH_2$ or stearamide of formula $C_{17}H_{35}$—$CONH_2$.

More advantageously still, the compound of general formula (IIA) is N,N'-ethylenedi(stearamide) of formula $C_{17}H_{35}$—CONH—$CH_2$—$CH_2$—NHCO—$C_{17}H_{35}$.

Preferably, according to a second alternative form, the compound of general formula (II) is chosen from those of formula (IIB):

$R_2$—CONH—$R_2'$  (IIB)

in which $R_2$ and $R_2'$ have the same definitions as above.

Advantageously, according to this alternative form, the sum of the numbers of the carbon atoms of $R_2$ and $R_2'$ is greater than or equal to 10, advantageously greater than or equal to 14, preferably greater than or equal to 18.

More advantageously still, according to this alternative form, the number of the carbon atoms of $R_2$ is greater than or equal to 10, advantageously greater than or equal to 12, preferably greater than or equal to 14, and $R_2'$=H.

Advantageously, the compound of general formula (II) is chosen from hydrazide derivatives, such as the compounds $C_5H_{11}$—CONH—NHCO—$C_5H_{11}$, $C_9H_{19}$—CONH—NHCO—$C_9H_{19}$, $C_{11}H_{23}$—CONH—NHCO—$C_{11}H_{23}$, $C_{17}H_{35}$—CONH—NHCO—$C_{17}H_{35}$ or $C_{21}H_{43}$—CONH—NHCO—$C_{21}H_{43}$, diamides, such as N,N'-ethylenedi(laurylamide) of formula $C_{11}H_{23}$—CONH—$CH_2$—$CH_2$—NHCO—$C_{11}H_{31}$, N,N'-ethylenedi(myristylamide) of formula $C_{13}H_{27}$—CONH—$CH_2$—$CH_2$—NHCO—$C_{13}H_{27}$, N,N'-ethylenedi(palmitamide) of formula $C_{15}H_{31}$—CONH—$CH_2$—$CH_2$—NHCO—$C_{15}H_{31}$ or N,N'-ethylenedi(stearamide) of formula $C_{17}H_{35}$—CONH—$CH_2$—$CH_2$—NHCO—$C_{17}H_{35}$; monoamides, such as laurylamide of formula $C_{11}H_{23}$—$CONH_2$, myristylamide of formula $C_{13}H_{27}$—$CONH_2$, palmitamide of formula $C_{15}H_{31}$—$CONH_2$ or stearamide of formula $C_{17}H_{35}$—$CONH_2$.

More advantageously still, the compound of general formula (II) is N,N'-ethylenedi(stearamide) of formula $C_{17}H_{35}$—CONH—$CH_2$—$CH_2$—NHCO—$C_{17}H_{35}$.

Preferably, when the chemical additive is chosen from the organic compounds of formula (II), it is used in combination with at least one other chemical additive chosen from the organic compounds of formulae (I), (III), (V), (VI) and (VII) and/or the reaction products of at least one $C_3$-$C_{12}$ polyol and of at least one $C_2$-$C_{12}$ aldehyde, in particular those comprising a group of formula (IV).

According to a third alternative form, the organogelator compound is a compound of formula (III):

(R—NHCO)$_x$—Z—(NHCO—R')$_y$  (III),

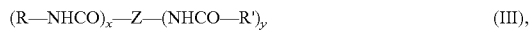

in which:

R and R', which are identical or different, represent a saturated or unsaturated and linear, branched or cyclic hydrocarbon chain comprising from 1 to 22 carbon atoms which is optionally substituted and which optionally comprises heteroatoms, such as N, O or S, $C_5$-$C_{24}$ hydrocarbon rings and/or $C_4$-$C_{24}$ hydrocarbon heterocycles comprising one or more heteroatoms, such as N, O or S, Z represents a trifunctionalized group chosen from the following groups:

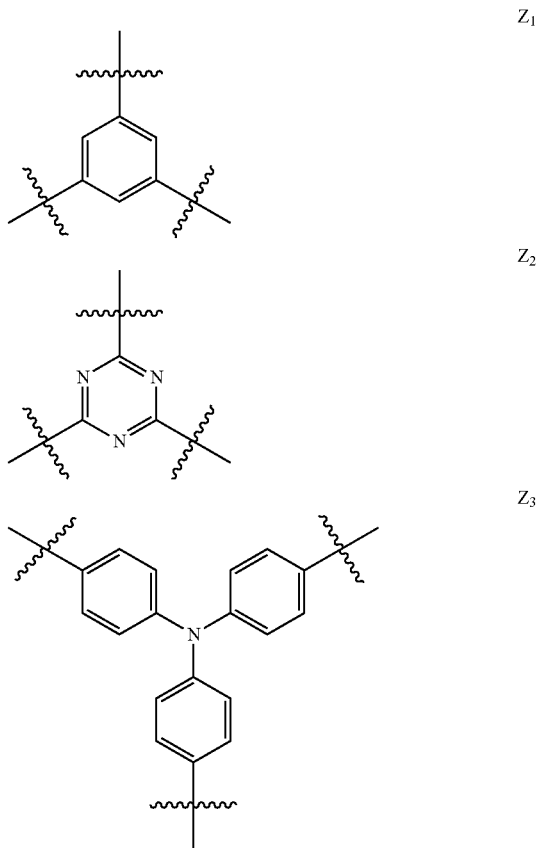

x and y are integers different in value varying from 0 to 3 and such that x+y=3.

Preferably, when x is equal to 0 and Z represents $Z_2$, the compound of formula (III) is N2,N4,N6-tridecoylmelamine having the following formula, with R' representing the $C_9H_{19}$ group:

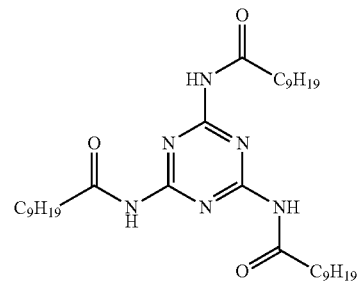

Other preferred compounds corresponding to the formula (III) are such that x is equal to 0, Z represents $Z_2$ and R' represents a saturated linear hydrocarbon chain of 1 to 22 carbon atoms, preferably of 2 to 18 carbon atoms, preferably of 5 to 12 carbon atoms.

Other preferred compounds corresponding to the formula (III) are such that: y is equal to 0 and Z represents $Z_1$; the compounds then have the formula:

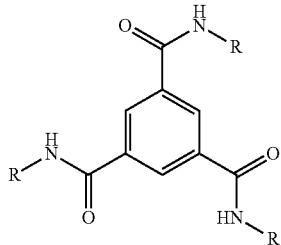

with R chosen from the following groups, taken alone or as mixtures:

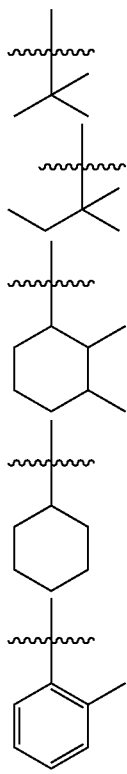

Other preferred compounds corresponding to the formula (III) are such that: y is equal to 0, Z represents $Z_1$ and R represents a saturated linear hydrocarbon chain of 1 to 22 carbon atoms, preferably of 8 to 12 carbon atoms.

According to a fourth alternative form, the organogelator compound is a reaction product of at least one $C_3$-$C_{12}$ polyol and of at least one $C_2$-$C_{12}$ aldehyde. Mention may be made, among the polyols which can be used, of sorbitol, xylitol, mannitol and/or ribitol. Preferably, the polyol is sorbitol.

Advantageously, according to this alternative form, the organogelator compound is a compound which comprises at least one functional group of general formula (IV):

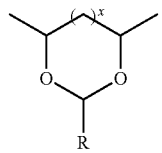

(IV)

with:

x is an integer,

R is chosen from a $C_1$-$C_{12}$ alkyl, $C_2$-$C_{12}$ alkenyl, $C_6$-$C_{12}$ aryl or $C_7$-$C_{12}$ aralkyl radical which is optionally substituted by one or more halogen atoms or one or more $C_1$-$C_6$ alkoxy groups.

According to this alternative form, the organogelator compound is advantageously a sorbitol derivative. The term "sorbitol derivative" is understood to mean any reaction product obtained from sorbitol, in particular any reaction product obtained by reacting an aldehyde with D-sorbitol. Sorbitol acetals, which are sorbitol derivatives, are obtained by this condensation reaction. 1,3:2,4-Di-O-benzylidene-D-sorbitol is obtained by reacting 1 mol of D-sorbitol and 2 mol of benzaldehyde and has the formula:

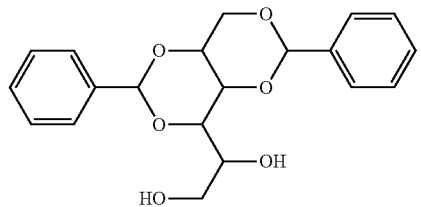 [SMILES: OCC(O)C1OC(c2ccccc2)OC2COC(c3ccccc3)OC21]

The sorbitol derivatives can thus be all the condensation products of aldehydes, in particular of aromatic aldehydes, with sorbitol. Sorbitol derivatives will then be obtained of general formula:

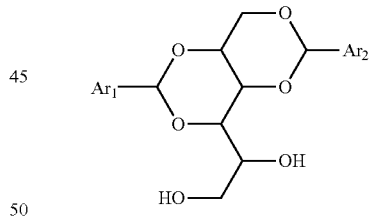

where $Ar_1$ and $Ar_2$ are optionally substituted aromatic nuclei.

The sorbitol derivatives, other than 1,3:2,4-di-O-benzylidene-D-sorbitol, can include, for example, 1,3:2,4:5,6-tri-O-benzylidene-D-sorbitol, 2,4-mono-O-benzylidene-D-sorbitol, 1,3:2,4-bis(p-methylbenzylidene)sorbitol, 1,3:2,4-bis(3,4-dimethylbenzylidene)sorbitol, 1,3:2,4-bis(p-ethylbenzylidene)sorbitol, 1,3:2,4-bis(p-propylbenzylidene) sorbitol, 1,3:2,4-bis(p-butylbenzylidene)sorbitol, 1,3:2,4-bis (p-ethoxylbenzylidene)sorbitol, 1,3:2,4-bis(p-chlorobenzylidene)sorbitol, 1,3:2,4-bis(p-bromobenzylidene)sorbitol, 1,3:2,4-di-O-methylbenzylidene-D-sorbitol, 1,3:2,4-di-O-dimethylbenzylidene-D-sorbitol, 1,3:2,4-di-O-(4-methylbenzylidene)-D-sorbitol and 1,3:2,4-di-O-(4,3-dimethylbenzylidene)-D-sorbitol. Preferably, according to this alternative form, the organogelator compound is 1,3:2,4-di-O-benzylidene-D-sorbitol.

According to a fifth alternative form, the organogelator compound is a compound of general formula (V):

$$R_5—(COOH)_z \quad (V),$$

in which $R_5$ represents a linear or branched and saturated or unsaturated chain comprising from 4 to 68 carbon atoms, preferably from 4 to 54 carbon atoms, more preferably from 4 to 36 carbon atoms, and z is an integer varying from 2 to 4.

Preferably, the $R_5$ group is a saturated linear chain of formula $C_wH_{2w}$, with w being an integer varying from 4 to 22, preferably from 4 to 12.

According to this alternative form of the invention, the organogelator compounds corresponding to the formula (V) can be diacids (z=2), triacids (z=3) or tetracids (z=4). The preferred organogelator compounds according to this alternative form are diacids with z=2.

Preferably, according to this alternative form, the diacids (V) have the general formula HOOC—$C_wH_{2w}$—COOH with w being an integer varying from 4 to 22, preferably from 4 to 12.

Advantageously, according to this alternative form, the organogelator compound is a diacid chosen from adipic acid or 1,6-hexanedioic acid with w=4, pimelic acid or 1,7-heptanedioic acid with w=5, suberic acid or 1,8-octanedioic acid with w=6, azelaic acid or 1,9-nonanedioic acid with w=7, sebacic acid or 1,10-decanedioic acid with w=8, undecanedioic acid with w=9, 1,2-dodecanedioic acid with w=10 or tetradecanedioic acid with w=12.

More advantageously, the organogelator compound is sebacic acid or 1,10-decanedioic acid with w=8.

The diacids can also be diacid dimers of unsaturated fatty acid(s), that is to say dimers formed from at least one unsaturated fatty acid, for example from a single unsaturated fatty acid or from two different unsaturated fatty acids. Diacid dimers of unsaturated fatty acid(s) are conventionally obtained by an intermolecular dimerization reaction of at least one unsaturated fatty acid (Diels-Alder reaction, for example).

Preferably, a single type of unsaturated fatty acid is dimerized. They are derived in particular from the dimerization of an unsaturated fatty acid, in particular a $C_8$ to $C_{34}$, in particular $C_{12}$ to $C_{22}$, especially $C_{16}$ to $C_{20}$ and more particularly $C_{18}$ unsaturated fatty acid. A preferred fatty acid dimer is obtained by dimerization of linoleic acid, it being possible for the dimer to be subsequently partially or completely hydrogenated.

Another preferred fatty acid dimer has the formula HOOC—$(CH_2)_7$—CH=CH—$(CH_2)_7$—COOH. Another preferred fatty acid dimer is obtained by dimerization of methyl linoleate. In the same way, it is possible to find triacids of fatty acids and tetracids of fatty acids, obtained respectively by trimerization and tetramerization of at least one fatty acid.

According to a sixth alternative form, the organogelator compound is a compound of general formula (VI):

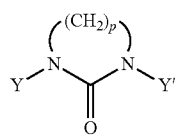

in which:

the Y and Y' groups represent, independently of one another, an atom or group chosen from: H, —$(CH_2)_q$—$CH_3$, —$(CH_2)_q$—$NH_2$, —$(CH_2)_q$—OH, —$(CH_2)_q$—COOH or

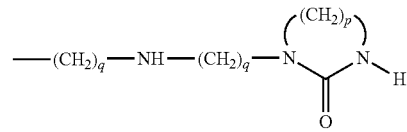

with q being an integer varying from 2 to 18, preferably from 2 to 10, preferably from 2 to 4, and p being an integer of greater than or equal to 2, preferably having a value of 2 or 3.

Mention may be made, among the preferred organogelator compounds corresponding to the formula (VI), of the following compounds:

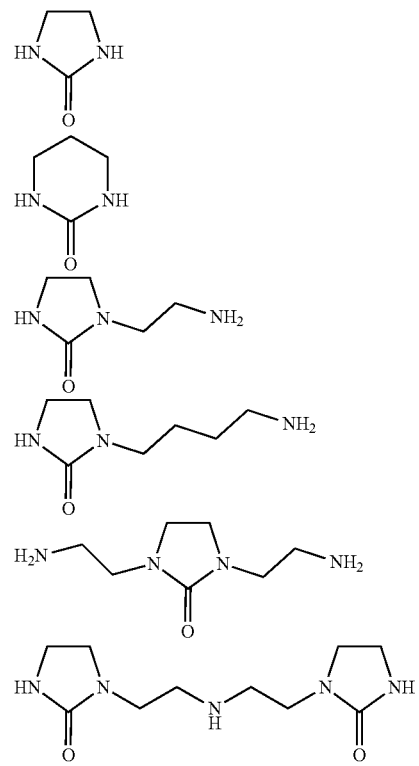

Preferably, according to this alternative form, the organogelator compound of general formula (VI) is:

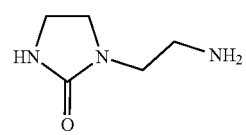

According to a seventh alternative form of this embodiment, the organogelator compound is a compound of general formula (VII):

R—NH—CO—CO—NH—R' (VII)

in which R and R', which are identical or different, represent a saturated or unsaturated and linear, branched or cyclic hydrocarbon chain comprising from 1 to 22 carbon atoms, preferably from 8 to 12 carbon atoms, which is optionally substituted and which optionally comprises heteroatoms, such as N, O or S, $C_5$-$C_{24}$ hydrocarbon rings and/or $C_4$-$C_{24}$ hydrocarbon heterocycles comprising one or more heteroatoms, such as N, O or S.

It will not be departing from the scope of the invention to combine several different chemical additives, such as different organogelator compounds of formulae (I), (II), (III), (V), (VI) and (VII), the reaction products of at least one $C_3$-$C_{12}$ polyol and of at least one $C_2$-$C_{12}$ aldehyde, in particular those comprising a group of formula (IV), in the oil composition.

Advantageously, the coating composition comprises at least one organogelator additive chosen from the compounds of formula (I), the compounds of formula (II) and the compounds of formula (V).

More advantageously, the coating composition comprises at least one organogelator additive chosen from the compounds of formula (I) or the compounds of formula (V).

Preferably, the coating composition comprises at least one organogelator additive which is 2',3-bis[(3-[3,5-di(tert-butyl)-4-hydroxyphenyl]propionyl)]propionohydrazide.

According to an advantageous embodiment, the coating composition comprises at least two organogelator compounds.

According to a first alternative form of this embodiment, the coating composition comprises at least one first organogelator compound of formula (V) and at least one second organogelator compound chosen from: the organogelator compounds of formula (I); the organogelator compounds of formula (II); the organogelator compounds of formula (III); the organogelator compounds of formula (V); the organogelator compounds of formula (VI); the organogelator compounds of formula (VII) and the reaction products of at least one $C_3$-$C_{12}$ polyol and of at least one $C_2$-$C_{12}$ aldehyde, in particular those comprising a group of formula (IV), the second organogelator compound being distinct from the first organogelator compound.

Preferably, and according to this first alternative form, the coating composition comprises at least one first organogelator compound of formula (V) and at least one second organogelator compound chosen from: the organogelator compounds of formula (I) and the organogelator compounds of formula (II).

When the second organogelator compound is chosen from the organogelator compounds of formula (II), it is preferably chosen from the organogelator compounds of formula (IIA).

Preferably, and still according to this first alternative form, the first organogelator compound of formula (V) is chosen from diacids (z=2), triacids (z=3) and tetracids (z=4), preferably from diacids (z=2).

More preferably, and still according to this first alternative form, the first organogelator compound of formula (V) is chosen from adipic acid or 1,6-hexanedioic acid with w=4, pimelic acid or 1,7-heptanedioic acid with w=5, suberic acid or 1,8-octanedioic acid with w=6, azelaic acid or 1,9-nonanedioic acid with w=7, sebacic acid or 1,10-decanedioic acid with w=8, undecanedioic acid with w=9, 1,2-dodecanedioic acid with w=10 or tetradecanedioic acid with w=12.

Advantageously, and according to this first alternative form, the first organogelator compound of formula (V) is sebacic acid or 1,10-decanedioic acid with w=8.

According to a second alternative form of this embodiment, the coating composition comprises at least one first organogelator compound of formula (II) and at least one second organogelator compound chosen from: the organogelator compounds of formula (I); the organogelator compounds of formula (II); the organogelator compounds of formula (III); the organogelator compounds of formula (V); the organogelator compounds of formula (VI); the organogelator compounds of formula (VII) and the reaction products of at least one $C_3$-$C_{12}$ polyol and of at least one $C_2$-$C_{12}$ aldehyde, in particular those comprising a group of formula (IV), the second organogelator compound being distinct from the first organogelator compound.

Preferably, and according to this second alternative form, the first organogelator compound of formula (II) is chosen from the organogelator compounds of formula (IIA).

More preferably, and according to this second alternative form, the coating composition comprises at least one first organogelator compound of formula (IIA) and at least one second organogelator compound chosen from: the organogelator compounds of formula (I); the organogelator compounds of formula (IIB); the organogelator compounds of formula (III); the organogelator compounds of formula (V); the organogelator compounds of formula (VI); the organogelator compounds of formula (VII) and the reaction products of at least one $C_3$-$C_{12}$ polyol and of at least one $C_2$-$C_{12}$ aldehyde, in particular those comprising a group of formula (IV), the second organogelator compound being distinct from the first organogelator compound.

More preferably still, and according to this second alternative form, the coating composition comprises at least one first organogelator compound of formula (IIA) and at least one second organogelator compound chosen from: the organogelator compounds of formula (I) and the organogelator compounds of formula (V).

Preferably, and according to this second alternative form, the first organogelator compound of formula (II) is N,N'-ethylenedi(stearamide).

When the second organogelator compound is chosen from the organogelator compounds of formula (V), it is preferably chosen from adipic acid or 1,6-hexanedioic acid with w=4, pimelic acid or 1,7-heptanedioic acid with w=5, suberic acid or 1,8-octanedioic acid with w=6, azelaic acid or 1,9-nonanedioic acid with w=7, sebacic acid or 1,10-decanedioic acid with w=8, undecanedioic acid with w=9, 1,2-dodecanedioic acid with w=10 or tetradecanedioic acid with w=12.

According to a third preferred alternative form of this embodiment, the coating composition comprises at least sebacic acid or 1,10-decanedioic acid and at least N, N'-ethylenedi(stearamide).

According to a fourth alternative form of this embodiment, the coating composition comprises at least one first organogelator compound of formula (I) and at least one second organogelator compound chosen from: the organogelator compounds of formula (I); the organogelator compounds of formula (II); the organogelator compounds of formula (III); the organogelator compounds of formula (V); the organogelator compounds of formula (VI); the organogelator compounds of formula (VII) and the reaction products of at least one $C_3$-$C_{12}$ polyol and of at least one $C_2$-$C_{12}$ aldehyde, in particular those comprising a group of formula (IV), the second organogelator compound being distinct from the first organogelator compound.

Preferably, and according to this fourth alternative form, the second organogelator compound is chosen from the organogelator compounds of formula (II) and the organogelator compounds of formula (V).

Preferably, and according to this fourth alternative form, when the second organogelator compound is chosen from the organogelator compounds of formula (II), it is chosen from the organogelator compounds of formula (IIA).

More preferably, and according to this fourth alternative form, the second organogelator compound of formula (II) is N,N'-ethylenedi(stearamide).

Preferably, and still according to this fourth alternative form, when the second organogelator compound is chosen from the organogelator compounds of formula (V), it is chosen from diacids (z=2), triacids (z=3) and tetracids (z=4), preferably from diacids (z=2).

More preferably still, and still according to this fourth alternative form, the second organogelator compound of formula (V) is chosen from adipic acid or 1,6-hexanedioic acid with w=4, pimelic acid or 1,7-heptanedioic acid with w=5, suberic acid or 1,8-octanedioic acid with w=6, azelaic acid or 1,9-nonanedioic acid with w=7, sebacic acid or 1,10-decanedioic acid with w=8, undecanedioic acid with w=9, 1,2-dodecanedioic acid with w=10 or tetradecanedioic acid with w=12.

Advantageously, and still according to this fourth alternative form, the second organogelator compound of formula (V) is sebacic acid or 1,10-decanedioic acid.

Preferably, and according to this fourth alternative form, the first organogelator compound of formula (I) is 2',3-bis[(3-[3,5-di(tert-butyl)-4-hydroxyphenyl]propionyl)]propionohydrazide.

Preferably, and according to this embodiment, the ratio by weight of the first organogelator compound with respect to the second organogelator compound is from 1:99 to 99:1, preferably from 1:9 to 9:1, more preferably still from 1:5 to 5:1.

Advantageously, the coating composition comprises from 0.1% to 10% by weight, preferably from 0.2% to 5% by weight, more preferably from 0.5% to 3.5% by weight, of organogelator compound, with respect to the total weight of the composition.

Advantageously, the core composition comprises at least one organogelator compound chosen from the organogelator compounds of formula (I), the organogelator compounds of formula (II) and the organogelator compounds of formula (V).

More advantageously, the core composition comprises at least one organogelator compound chosen from the organogelator compounds of formula (I) and the organogelator compounds of formula (V).

Preferably, the core composition comprises at least one organogelator compound which is sebacic acid.

Coating Composition

Advantageously, the coating composition comprises at least one organogelator compound.

More advantageously, the coating composition comprises at least one organogelator compound chosen from the compounds of formula (I), the compounds of formula (II) and the compounds of formula (V). More advantageously still, the coating composition comprises at least one organogelator compound chosen from the compounds of formula (I) and the compounds of formula (V).

Preferably, the coating composition comprises at least one organogelator additive chosen from:
2',3-bis[(3-[3,5-di(tert-butyl)-4-hydroxyphenyl]propionyl)]propionohydrazide,
sebacic acid, and
the mixtures of these compounds.

Advantageously, the coating composition comprises from 0.1% to 10% by weight, preferably from 0.2% to 5% by weight, more preferably from 0.5% to 3.5% by weight, of an organogelator compound, with respect to the total weight of the coating composition.

Advantageously, when the organogelator compound is chosen from those corresponding to the formula (I), in particular 2',3-bis[(3-[3,5-di(tert-butyl)-4-hydroxyphenyl]propionyl)]propionohydrazide, the coating composition comprises from 0.1% to 5% by weight, preferably from 0.2% to 3.5% by weight, of organogelator compound, with respect to the total weight of the coating composition.

The coating composition comprises the oil, the organogelator compound or compounds and, if appropriate, other additives. The other additives can be chosen, for example, from: antiagglomerating compounds, adhesion agents, elastomers for bitumen, and the like.

Advantageously, the coating composition comprises, or is essentially constituted of:
80% to 99.9% by weight of at least one oil chosen from: hydrocarbon oils of petroleum or synthetic origin, advantageously from hydrocarbon oils of petroleum origin,
0.1% to 10% by weight of at least one organogelator compound,
0% to 10% by weight of one or more other additives, with respect to the total weight of the composition.

Preferably, the coating composition comprises, or is essentially constituted of:
85% to 99.8% by weight of at least one oil chosen from: hydrocarbon oils of petroleum or synthetic origin, advantageously from hydrocarbon oils of petroleum origin,
0.2% to 5% by weight of at least one organogelator compound,
0% to 10% by weight of one or more other additives, with respect to the total weight of the composition.

More preferably, the coating composition comprises, or is essentially constituted of:
86.5% to 99.5% by weight of at least one oil chosen from: hydrocarbon oils of petroleum or synthetic origin, advantageously from hydrocarbon oils of petroleum origin,
0.5% to 3.5% by weight of at least one organogelator compound,
0% to 10% by weight of one or more other additives, with respect to the total weight of the composition.

According to a first preferred embodiment, the organogelator compound is chosen from those corresponding to the formula (I), in particular 2',3-bis[(3-[3,5-di(tert-butyl)-4-hydroxyphenyl]propionyl)]propionohydrazide.

Advantageously, according to this embodiment, the coating composition comprises, or is essentially constituted of:
85% to 99.9% by weight of at least one hydrocarbon oil of petroleum origin,
0.1% to 5% by weight of at least one organogelator compound of formula (I), advantageously 2',3-bis[(3-[3,5-di(tert-butyl)-4-hydroxyphenyl]propionyl)]propionohydrazide.
0% to 10% by weight of one or more other additives, with respect to the total weight of the composition.

Preferably, the coating composition comprises, or is essentially constituted of:
86.5% to 99.8% by weight of at least one hydrocarbon oil of petroleum origin, 0.2% to 3.5% by weight of at least one organogelator compound of formula (I), advantageously 2',3-bis[(3-[3,5-di(tert-butyl)-4-hydroxyphenyl]propionyl)]propionohydrazide.

0% to 10% by weight of one or more other additives, with respect to the total weight of the composition.

Process for the Preparation of the Coating Composition

The coating compositions can be prepared, for example, according to the following process comprising the stages of:
- a) mixing the oil, for example the DAO or RAE oil, and heating at a temperature of between 140 and 200° C., preferably between 150 and 180° C., for example from 1 minute to 30 minutes,
- b) addition of the organogelator compound, mixing and heating at a temperature of between 140 and 200° C., preferably between 150 and 170° C., for example from 10 minute to 2 hours,
- c) optional addition of one or more other additives, mixing and heating at a temperature of between 140 and 200° C., preferably between 150 and 170° C., for example from 5 minute to 20 minutes,
- d) use in the process for the manufacture of the pellets.

The order of stages (a) to (c) can be modified.

Process for the Manufacture of the Pellets:

Another subject matter of the invention relates to a process for the manufacture of a bitumen which is solid at ambient temperature in the form of pellets composed of a core and of a coating layer for the core, this process comprising:
- i) the shaping of the core from at least one bitumen base,
- ii) the coating of the core with a coating composition over all or part of its surface,
- iii) optionally, the drying of the pellets obtained in stage ii) at a temperature ranging from 20 to 60° C., for a period of time ranging from 5 minutes to 5 hours, preferably from 5 minutes to 2 hours,
- iv) optionally, the coating of the pellets resulting from stage ii) or from stage iii), over all or a part of their surface, with at least one antiagglomerating compound.

Preferably, the application stage ii) is carried out by dipping, spraying, coextrusion, and the like.

Preferably, stage iv) of coating the pellets is carried out by dusting, sieving, and the like.

The shaping of the core of the pellets from an optionally additivated bitumen base can be carried out according to any known process, for example according to the manufacturing process described in the document U.S. Pat. No. 3,026,568, the document U.S. Pat. No. 4,279,579, the document WO 2009/153324 or the document WO 2012/168380. According to a specific embodiment, the shaping of the core of the solid bitumen can be carried out by draining, in particular using a drum.

Other techniques can be used in the process for the manufacture of the solid bitumen core, in particular molding, pelletizing, extrusion, and the like.

Preferably, the solid bitumen core particles exhibit a longest mean dimension ranging from 1 to 30 mm, advantageously from 4 to 20 mm, more advantageously from 4 to 15 mm.

Another subject matter of the invention is a bitumen which is solid at ambient temperature in the form of pellets, which is capable of being obtained by the implementation of the process according to the invention as described above. Such a solid bitumen in the form of pellets advantageously exhibits the properties described above.

Uses of the Solid Bitumen Pellets:

Another subject matter of the invention also relates to the use of the pellets of bitumen which is solid at ambient temperature according to the invention as are described above as road binder.

The road binder can be employed to manufacture bituminous mixes, in combination with aggregates, according to any known process.

Preferably, the bitumen which is solid at ambient temperature according to the invention is used for the manufacture of bituminous mixes.

The bituminous mixes are used as materials for the construction and maintenance of road foundations and their surfacing, and also for carrying out all road works. Mention may be made, for example, of surface coatings, hot bituminous mixes, cold bituminous mixes, cold-poured bituminous mixes, grave emulsions, base layers, bond layers, tie layers and running layers, and other combinations of a bituminous binder and of the road aggregate having specific properties, such as anti-rutting layers, draining bituminous mixes, or asphalts (mixture between a bituminous binder and aggregates of the sand type).

Another subject matter of the invention relates to a process for the manufacture of bituminous mixes comprising at least one road binder and aggregates, the road binder being chosen from the bitumens according to the invention, this process comprising at least the stages of:
- heating the aggregates at a temperature ranging from 100° C. to 180° C., preferably from 120° C. to 160° C.,
- mixing the aggregates with the road binder in a vessel, such as a mixer or a drum mixer,
- obtaining bituminous mixes.

The process of the invention exhibits the advantage of being able to be employed without a preliminary stage of heating the solid bitumen pellets.

The process for the manufacture of bituminous mixes according to the invention does not require a stage of heating the solid bitumen pellets before mixing with the aggregates because, on contact with the hot aggregates, the bitumen which is solid at ambient temperature melts.

The bitumen which is solid at ambient temperature according to the invention as described above exhibits the advantage of being able to be added directly to the hot aggregates, without having to be melted prior to the mixing with the hot aggregates.

Preferably, the stage of mixing the aggregates and the road binder is carried out with stirring, and then the stirring is maintained for at most 5 minutes, preferably at most 1 minute, in order to make it possible to obtain a homogeneous mixture.

The solid bitumen in the form of pellets according to the present invention is noteworthy in that it makes possible the transportation and/or the storage of road bitumen at ambient temperature under optimal conditions, in particular without there being agglomeration and/or adhesion of the solid bitumen during its transportation and/or its storage, even when the ambient temperature is elevated. Furthermore, the coating layer of the pellets breaks under the effect of the contact with the hot aggregates and of the shearing and it releases the bitumen base. Finally, the presence of the coating layer in the mixture of road binder and of aggregates does not damage the properties of said road bitumen for a road application, in comparison with an uncoated bitumen base.

Process for the Transportation and/or Storage and/or Handling of Road Bitumen

Another subject matter of the invention also relates to a process for the transportation and/or storage and/or handling of road bitumen, said road bitumen being transported and/or stored and/or handled in the form of pellets of bitumen which is solid at ambient temperature.

Preferably, the road bitumen is transported and/or stored at an elevated ambient temperature for a period of time of greater than or equal to 2 months, preferably of greater than or equal to 3 months.

Preferably, the elevated ambient temperature is from 20° C. to 90° C., preferably from 20° C. to 80° C., more preferably from 40° C. to 80° C., more preferably still from 40° C. to 60° C.

The bitumen pellets according to the invention exhibit the advantage of retaining their divided form and thus of being able to be handled, after storage and/or transportation at an elevated ambient temperature. They exhibit in particular the ability to flow under their own weight without creeping, which allows them to be stored packaged in bags, in drums or in containers of any shape and of any volume and then to be transferred from this packaging to an item of equipment, such as a work site item of equipment (vessel, mixer, and the like).

The bitumen pellets are preferably transported and/or stored in bulk in bags of 500 g to 100 kg or of 500 kg to 1000 kg, commonly called big bags in the field of road bitumens, said bags preferably being made of hot-melt material. They can also be transported and/or stored in bulk in boxes of 5 kg to 30 kg or in drums of 100 kg to 200 kg.

The various embodiments, alternative forms, preferences and advantages described above for each of the subject matters of the invention apply to all the subject matters of the invention and can be taken separately or in combination.

The invention is illustrated by the following examples given as nonlimiting.

Experimental Part

1. Material and Methods

The rheological and mechanical characteristics of the bitumens to which reference is made in these examples are measured in the ways shown in table 1.

TABLE 1

| Property | Abbreviation | Unit | Measurement standard |
|---|---|---|---|
| Needle penetrability at 25° C. | $P_{25}$ | 1/10 mm | NF EN 1426 |
| Ring-and-ball softening temperature | RBT | ° C. | NF EN 1427 |

The variation in the ring-and-ball softening temperature (RBT) is measured according to the standard NF EN 1427 from said composition between the sample extracted from the top part of the sample tube and the sample extracted from the bottom part of the sample tube.

1.1 Core Composition:

The bitumen base $B_2$ is prepared from:
- a bitumen base of 35/50 grade, denoted $B_1$, having a penetrability $P_{25}$ of 34 1/10 mm and an RBT of 52.6° C. and commercially available from the Total group under the Azalt® brand;
- 1,10-decanedioic acid (sebacic acid), denoted acid;
- flowers of sulfur, denoted crosslinking agent;
- zinc octanoate, denoted scavenger.

The amounts as percentage by weight used for the bitumen base are shown in table 2 below.

TABLE 2

| Bitumen | $B_2$ |
|---|---|
| Bitumen base $B_1$ | 98.5% |
| Acid | 1.5% |
| SBS | — |
| Crosslinking agent | |
| Scavenger | |
| $P_{25}$ (1/10 mm) | 14 |
| RBT (° C.) | 93 |

The bitumen is prepared in the following way.

For the bitumen $B_2$, the bitumen base $B_1$ is introduced into a reactor maintained a 160° C. with stirring at 300 revolutions/min for two hours. The acid is subsequently introduced into the reactor. The contents of the reactor are maintained at 160° C. with stirring at 300 revolutions/min for 1 hour.

1.2 Coating Composition

The coating compositions $C_1$ and $C_2$ are prepared from:

Oil:

An RAE oil, that is to say an aromatic oil, sold by Total under the Régénis 50® brand, was used.

Organogelator Compounds:
- Additive A1 of formula (I): 2',3-bis[(3-[3,5-di(tert-butyl)-4-hydroxyphenyl]propionyl)]propionohydrazide (CAS 32687-78-8), sold by BASF under the Irganox MD 1024 brand,
- Additive A2 of formula (IIA): N,N'-ethylene(stearamide), sold by Croda under the name Crodawax 140®.

The amounts as percentage by weight used for the preparation of the coating compositions $C_1$ and $C_2$ are shown in table 3 below.

TABLE 3

| Composition | $C_1$ | $C_2$ |
|---|---|---|
| RAE oil | 98.5% | 97% |
| Additive A1 | 1.5% | 1.5% |
| Additive A2 | — | 1.5% |

The coating compositions $C_1$ and $C_2$ are prepared according to the following general process:

(i) the oil is heated, for example to 170° C.;

(ii) the organogelator compound or compounds is/are added, and mixing is carried out, for example, for 1 h at 170° C. with a stirring speed of 400 rev/min;

(iii) when the organogelator additive or additives have completely dissolved, the stirring and a conditioning are maintained at a temperature at which the solution remains liquid, until used for coating the pellets.

2. Preparation of the Different Pellets of Solid Bitumens $G_1$ 2.1 General Method for the Preparation of the Cores Made of Bitumen of the Pellets According to the Invention The bitumen base $B_2$ is reheated at 160° C. for two hours in an oven before being poured into a silicone mold exhibiting different holes of spherical shape, so as to form the solid bitumen cores. After having observed the solidification of the bitumen in the mold, the surplus is levelled off with a blade heated with a Bunsen burner. After 30 minutes, the solid bitumen in the form of uncoated pellets is removed from the mold and stored in a tray covered with silicone-treated paper. The cores made of bitumen are subsequently allowed to cool to ambient temperature for 10 to 15 minutes.

2.2 General Method for the Preparation of the Cores Made of Bitumen of the Pellets According to the Invention with an Industrial Process For the implementation of this method, use may be made of a device and of a process as described in a highly detailed way in the U.S. Pat. No. 4,279,579. Different models of this device are available commercially from Sandwik under the Rotoform trade name.

Bitumen pellets can also be obtained from the bituminous composition $B_2$ poured into the tank of such a device and maintained at a temperature of between 130 and 160° C.

An injection nozzle or several injection nozzles make(s) possible the transfer of the bitumen composition $B_2$ inside the double pelletizing drum comprising an external rotating drum, the two drums being equipped with slots, nozzles and orifices making possible the pelletizing of bitumen drops through the first stationary drum and orifices exhibiting a diameter of between 2 and 8 mm of the external rotating drum. The bitumen drops are deposited on the upper face of a horizontal conveyor belt driven by rollers.

2.3 General Method for the Coating of the Core of the Pellets

The cores of pellets $G_1$ obtained above are dipped in one of the liquid coating compositions $C_1$ or $C_2$, prepared above, and then left to dry at ambient temperature.

Different coated pellets are thus obtained:
the pellets $G_1'$, obtained from the coating composition $C_1$, and
the pellets $G_2'$, obtained from the coating composition $C_2$.

3. Evaluation of the Behavior of the Pellets: Sticky Aspect

The sticky aspect of the pellets $G_1'$ and $G_2'$, prepared above, is evaluated to the touch by a handler.

For pellets of each type, the handler withdraws approximately ten pellets and evaluates the sticky nature of each of them by placing them first of all between two fingers and by then attempting to separate the fingers from the surface of the pellet.

The results obtained are given in the following table 4.

TABLE 4

|  | Pellets | |
| --- | --- | --- |
|  | $G_1'$ | $G_2'$ |
| Sticky aspect | + | ++ |

+: pellets slightly sticky,
++: pellets very slightly sticky.

The two coating compositions $C_1$ and $C_2$ make it possible to obtain bitumen pellets which are slightly sticky. The coating composition $C_2$, corresponding to the combination of the two organogelator compounds, makes it possible to obtain pellets which are even less sticky.

The invention claimed is:

1. A bitumen which is solid at ambient temperature in the form of pellets comprising a core and a coating layer, in which:
the core comprises at least one bitumen base, and
the coating layer comprises at least:
one oil chosen from a hydrocarbon oil of petroleum or synthetic origin,
from 0.1% to 10% by weight, with respect to the total weight of the coating layer, of one or more organogelator compounds chosen from the compounds of general formula (I) or (V):

Ar1-R$_1$—Ar2     (I)

in which:
Ar1 and Ar2 represent, independently of one another, a benzene nucleus or a system of condensed aromatic nuclei of from 6 to 20 carbon atoms which are substituted by at least one hydroxyl group and optionally substituted by one or more $C_1$-$C_{20}$ alkyl groups, and
$R_1$ represents an optionally substituted divalent radical, the main chain of which comprises from 6 to 20 carbon atoms and at least one group chosen from the amide, ester, hydrazide, urea, carbamate and anhydride functional groups;

$R_5$—(COOH)$_z$     (V)

in which:
$R_5$ represents a linear or branched and saturated or unsaturated chain comprising from 4 to 68 carbon atoms, and z is an integer varying from 2 to 4.

2. The bitumen as claimed in claim 1, in which the hydrocarbon oil is chosen from hydrocarbon oils of petroleum origin.

3. The bitumen as claimed in claim 1, in which the hydrocarbon oil is chosen from aromatic oils having a content of aromatic compounds of between 30% and 95% by weight, with respect to the total weight of the aromatic oil.

4. The bitumen as claimed in claim 1, in which the hydrocarbon oil is chosen from paraffinic oils exhibiting a total content of paraffinic compounds of at least 50% by weight, with respect to the total weight of the paraffinic oil.

5. The bitumen as claimed in claim 4, in which the paraffinic oil exhibits the respective contents:
(i) a total content of paraffinic compounds of between 50% and 90%;
(ii) a total content of naphthenic compounds of between 5% and 25%; and
(iii) a total content of aromatic compounds of between 5% and 25%, the percentages being expressed by weight with respect to the total weight of the paraffinic oil.

6. The bitumen as claimed in claim 1, in which the coating layer comprises from 80% to 99.9% of at least one oil, by weight, with respect to the total weight of the coating layer.

7. The bitumen as claimed in claim 1, wherein the coating composition comprises:
80% to 99.9% by weight of at least one oil chosen from: hydrocarbon oils of petroleum or synthetic origin, advantageously from hydrocarbon oils of petroleum origin,
0.1% to 10% by weight of at least one organogelator compound,
0% to 10% by weight of one or more other additives.

8. The bitumen as claimed in claim 1, wherein the organogelator compound is chosen from those corresponding to the formula (I).

9. The bitumen as claimed in claim 8, wherein the organogelator compound is 2',3-bis[(3-[3,5-di(tert-butyl)-4-hydroxyphenyl]propionyl)]propionohydrazide.

10. The bitumen as claimed in claim 1, in which the core additionally comprises at least one compound chosen from the organogelator compounds.

11. The bitumen as claimed in claim 10, in which the bituminous composition forming the core of the pellets comprises:
one or more bitumen bases,
between 0.1% and 5% by weight of at least one organogelator compound, with respect to the total weight of bitumen of said pellets.

12. The bitumen as claimed in claim 1, in which the core additionally comprises at least one pitch having a penetrability at 25° C. ranging from 0 to 20 ¹/₁₀ mm and a ring-and-ball softening temperature (RBT) ranging from 115° C. to 175° C., it being understood that the penetrability is measured according to the standard EN 1426 and that the RBT is measured according to the standard EN 1427.

13. The bitumen as claimed in claim 12, in which the bituminous composition forming the core of the pellets comprises from 2% to 30% by weight of pitch, with respect to the total weight of the composition.

14. A bitumen as claimed in claim 1 which can be transported or stored at ambient temperature.

15. A process for the manufacture of a bitumen as claimed in claim 1, this process comprising:

i) the shaping of the core from at least one bitumen base, ii) the coating of the core with a coating composition over all or part of its surface, iii) optionally, the drying of the pellets obtained in stage ii) at a temperature ranging from 20 to 60° C., for a period of time ranging from 5 minutes to 5 hours.

16. A bituminous mix which comprises a bitumen as claimed in claim 1 and which additionally comprises aggregates and optionally inorganic and/or synthetic fillers.

17. The bituminous mix as claimed in claim 16, which is a road bituminous mix, a bituminous concrete or a bituminous mastic.

18. A bituminous mix according to claim 16, which is obtained by a method comprising at least the stages of:

heating the aggregates at a temperature ranging from 100° C. to 180° C., mixing the aggregates with the road binder in a vessel, such as a mixer or a drum mixer, obtaining a bituminous mix.

19. The bituminous mix as claimed in claim 18, wherein the method does not comprise a stage of heating the road binder before it is mixed with the aggregates.

* * * * *